Sept. 1, 1925.

O. A. HANFORD 1,551,936

MACHINE FOR PRODUCING BLOWN GLASS ARTICLES

Filed Oct. 27, 1909 17 Sheets-Sheet 8

WITNESSES:
Albert L. Krey
Golden Brown

INVENTOR:
O. A. Hanford
atty

Sept. 1, 1925.

O. A. HANFORD 1,551,936

MACHINE FOR PRODUCING BLOWN GLASS ARTICLES

Filed Oct. 27, 1909     17 Sheets-Sheet 9

WITNESSES:     INVENTOR:

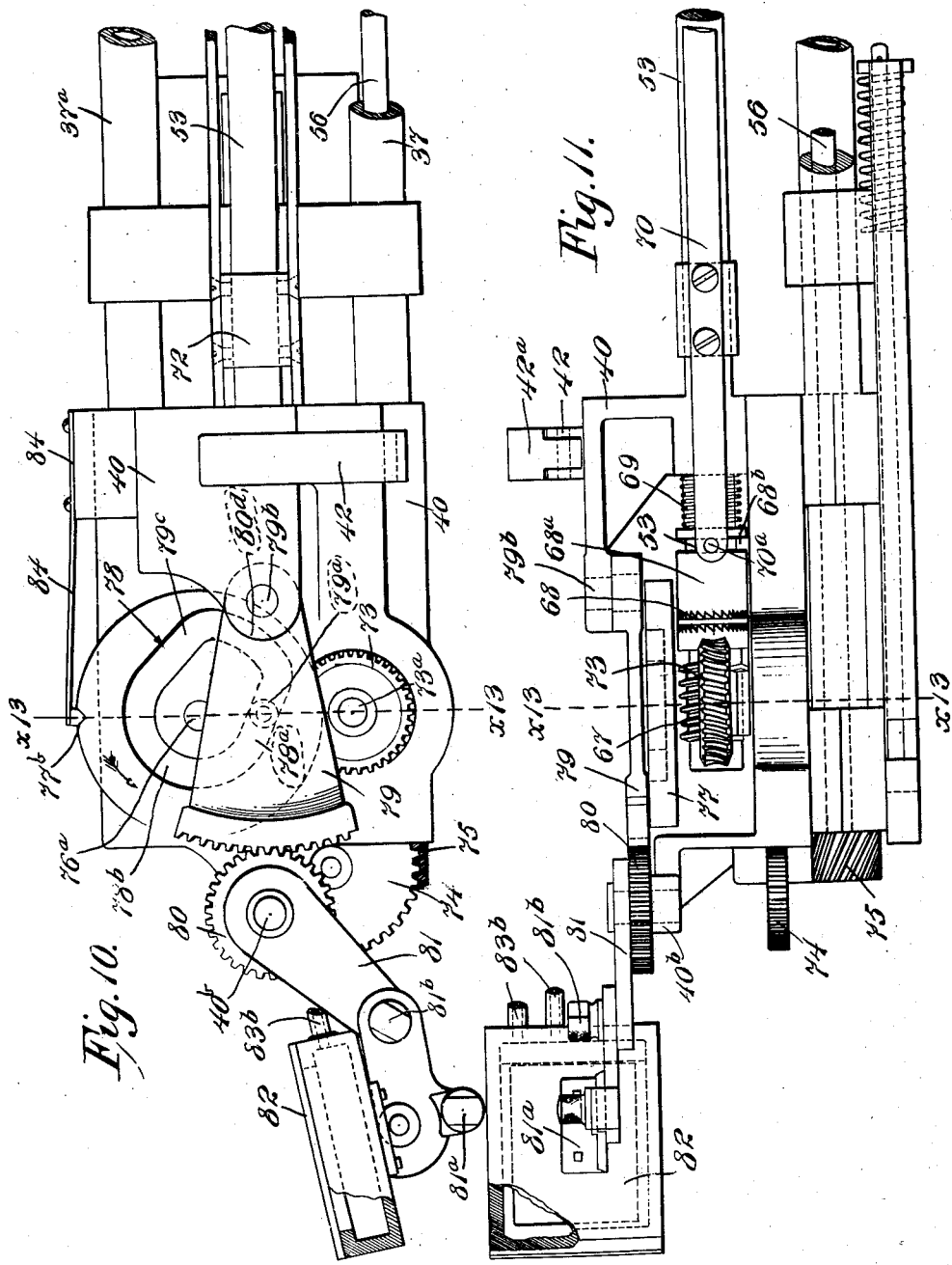

Sept. 1, 1925.
O. A. HANFORD
1,551,936
MACHINE FOR PRODUCING BLOWN GLASS ARTICLES
Filed Oct. 27, 1909    17 Sheets-Sheet 11
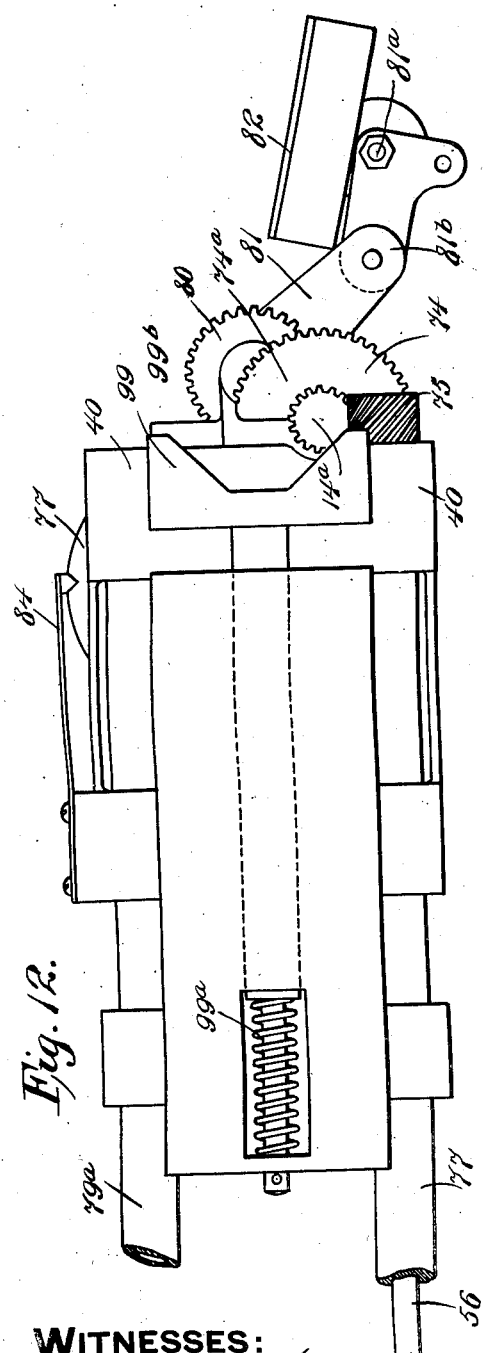
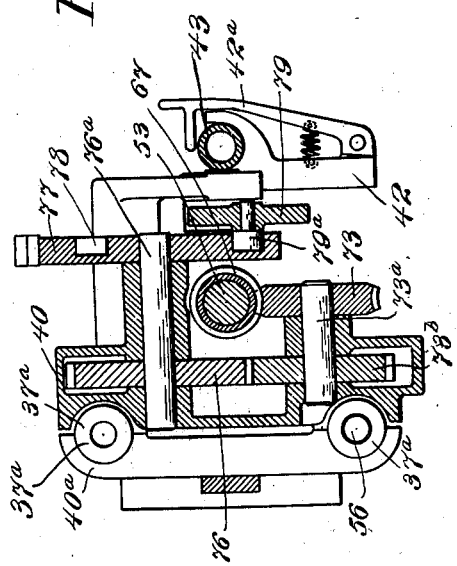
WITNESSES:
INVENTOR:

Sept. 1, 1925
O. A. HANFORD
MACHINE FOR PRODUCING BLOWN GLASS ARTICLES
Filed Oct. 27, 1909
1,551,936
17 Sheets-Sheet 12
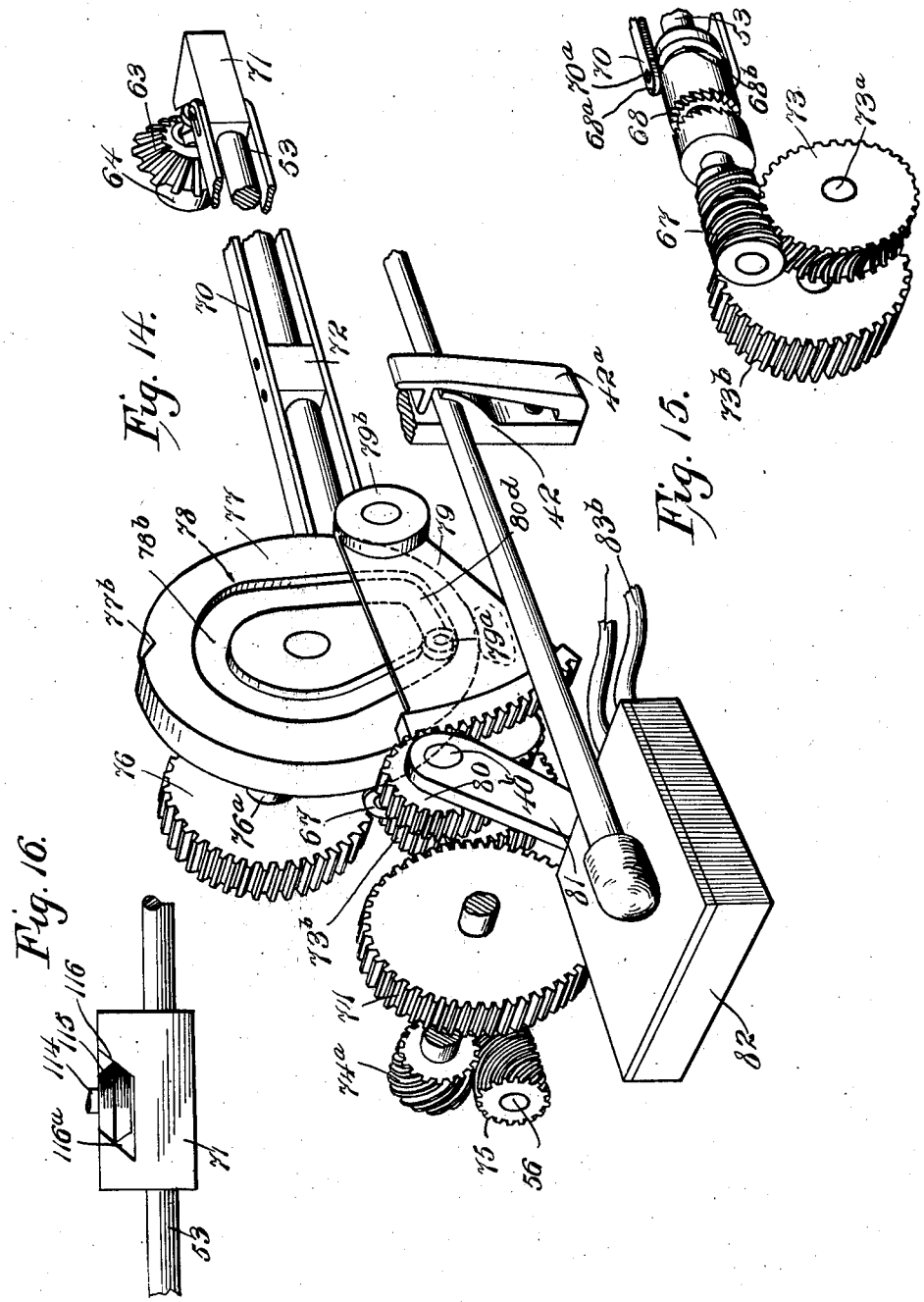
WITNESSES:
INVENTOR:

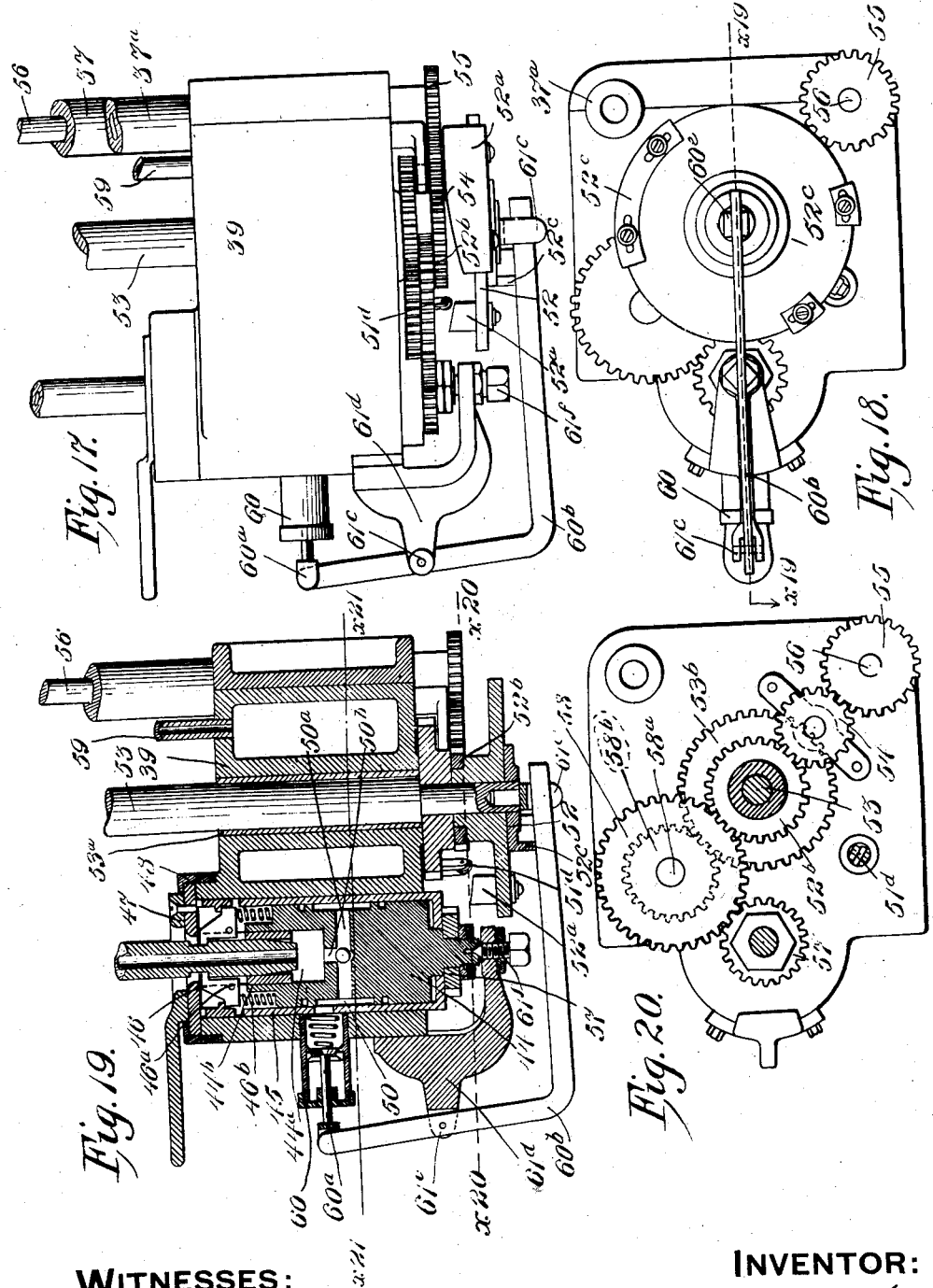

Sept. 1, 1925. 1,551,936
O. A. HANFORD
MACHINE FOR PRODUCING BLOWN GLASS ARTICLES
Filed Oct. 27, 1909 17 Sheets-Sheet 14

WITNESSES:
Albert L. Krey.
Golden Brown

INVENTOR:
O. A. Hanford

Sept. 1, 1925.
O. A. HANFORD
1,551,936
MACHINE FOR PRODUCING BLOWN GLASS ARTICLES
Filed Oct. 27, 1909     17 Sheets-Sheet 15
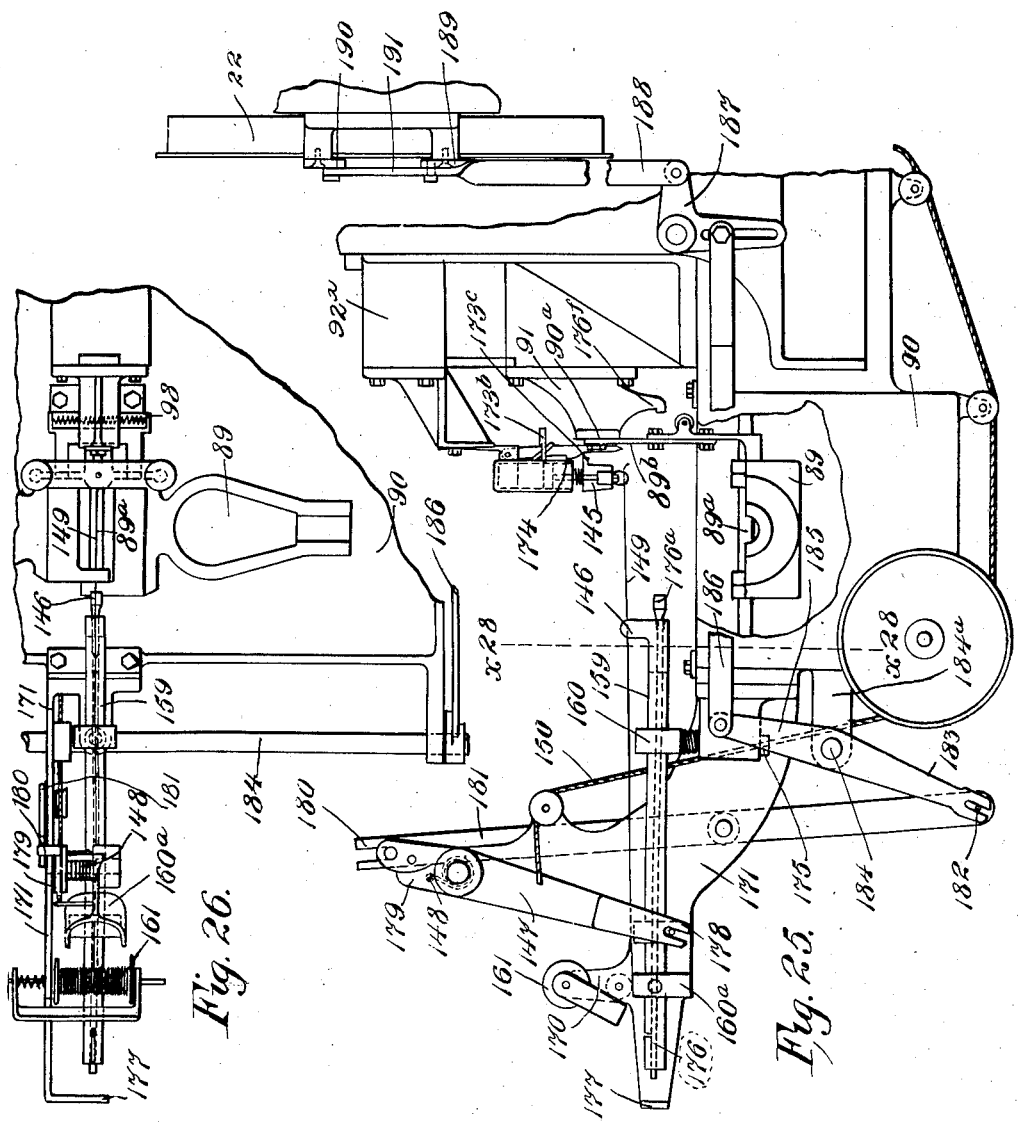
WITNESSES:
INVENTOR:

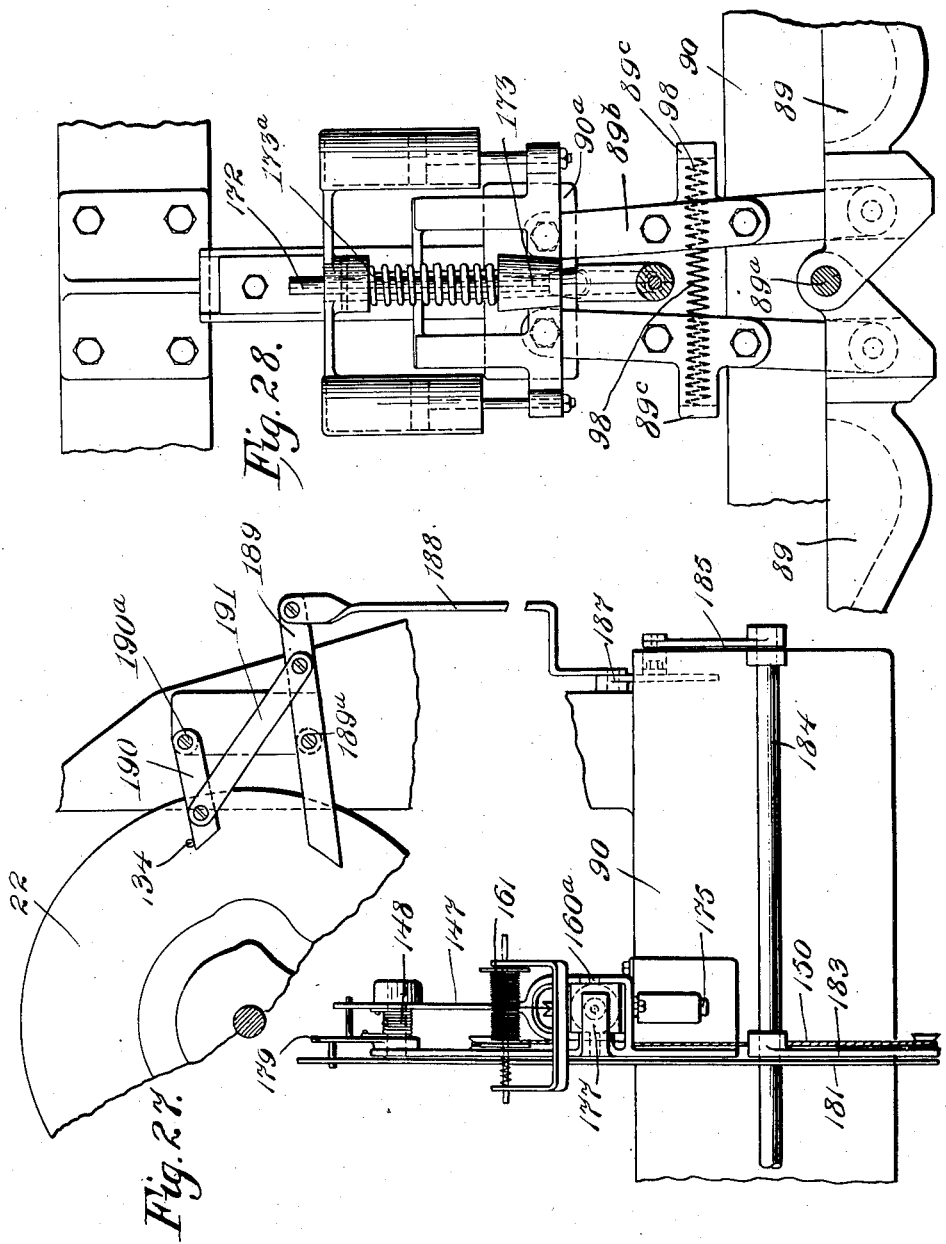

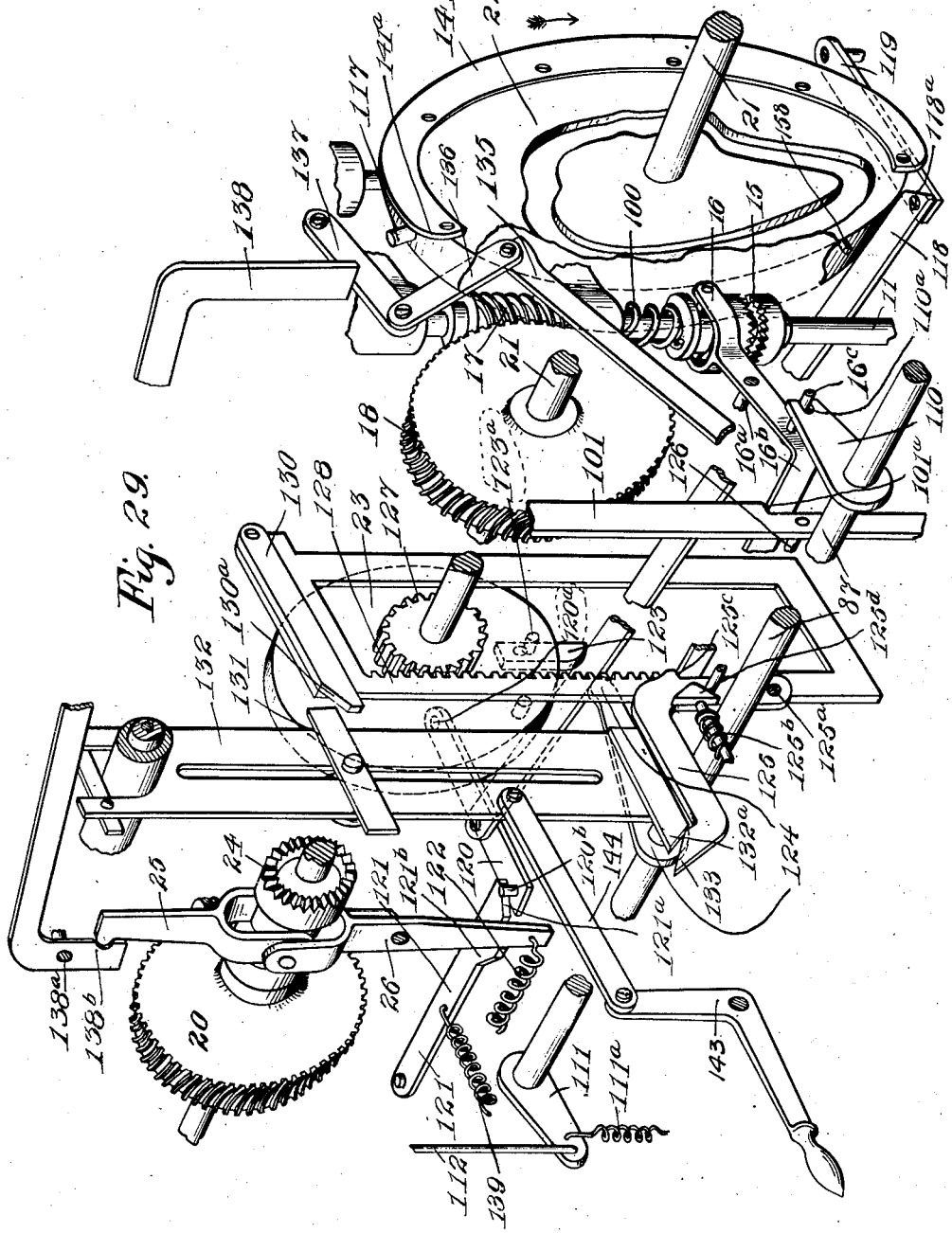

Patented Sept. 1, 1925.

1,551,936

UNITED STATES PATENT OFFICE.

ORIN A. HANFORD, OF ROCHESTER, NEW YORK, ASSIGNOR, BY MESNE ASSIGNMENTS, TO HARTFORD-EMPIRE COMPANY, OF HARTFORD, CONNECTICUT, A CORPORATION OF DELAWARE.

MACHINE FOR PRODUCING BLOWN-GLASS ARTICLES.

Application filed October 27, 1909. Serial No. 524,994.

*To all whom it may concern:*

Be it known that I, ORIN A. HANFORD, a citizen of the United States of America, and a resident of Rochester, New York, have invented certain new and useful Improvements in Machines for Producing Blown-Glass Articles, of which the following is a specification.

Generally speaking the machine forming the subject matter of this application comprises a movable blow-pipe frame adapted to receive and support a blow-pipe with a gather of glass thereon, and to be oscillated to swing the blow-pipe for properly distributing the gather and presenting it to the mold, a marverer or block adapted to act upon the gather, molds adapted to close upon the gather and open and be cooled after the blowing, and mechanism for controlling the air pressure in the gather and as the object of the invention is to dispense as much as possible with the employment of attendants, the machine further provides means whereby a proper sequence is obtained and the desired interaction of its parts occurs automatically upon the starting of the machine by the workman, when he has inserted therein the blow-pipe with the gather thereon, although I will describe means whereby the automatic action of the machine in blowing and molding may be dispensed with and such actions be initiated by an operator when desired.

The automatic action of the machine in blowing and molding, when such automatic action is present, may follow at a predetermined time interval after a preceding action of the machine (to permit elongation) or may automatically occur after a time interval determined by the condition of the glass itself.

To secure the proper and desirable action of a machine having the general features of my invention as before described, I have devised numerous subsiduary features and my invention therefore further consists in the construction, arrangement and combination of the several parts of which it is composed as will be hereinafter more fully described and be claimed after I shall have described the best construction known by me by which the objects above set forth may be obtained although it is obvious that the several features of my invention may be embodied in different types of mechanisms.

For clearness I shall specifically describe my invention solely with reference to the accompanying drawings, without reference to modifications thereof, which while embodying its principles of operation employ equivalent structures, as such changes will be obvious to those skilled in the art and it is not to be understood that by such specific description of the means employed to produce the results specified, I restrict myself to the described instrumentalities. When I consider invention to reside in the means employed, I shall make specific claims thereto.

As shown in the drawing the machine comprises a frame, in which the several instrumentalities and co-ordinating mechanisms together with a motor therefor are mounted, the motor being located in the base of the frame. The blow-pipe frame is carried on a longitudinal shaft in the head of the main frame, being located in front of the latter and swinging transversely across it, while the mold mechanism is located in front of the bottom of the main frame, and below the shaft of the blow-pipe frame. The marverer is carried on one end of the blow-pipe frame and the blow regulating mechanism upon the other. The various co-ordinating devices are variously located as may be demanded by the necessities of their construction or operation. In the following description that end of the machine at which the blow-pipe frame is located will be called the front and the terms "right" and "left" will refer to the machine as shown in the drawings, although it is obvious that the disposition of the parts may be reversed.

Referring to the accompanying drawings in which corresponding parts are designated by corresponding marks of reference:—

Figure 10 is an enlarged front elevation of the marvering end of the blow-pipe frame.

Figures 11 and 12 are inverted plan and rear views thereof.

Figure 13 is a section on lines $x^{13}$—$x^{13}$ of Figure 10.

Figure 14 is a prospective view of the marverer and air valve drive, the parts being shown in their marvering position.

Figure 15 is a prospective view of a detail of the drive.

Figure 16 is a plan view of the shifter for the marvering clutch.

Figure 17 is a plan of the air head end of the blow-pipe support.

Figure 18 is an end elevation thereof.

Figure 19 is a section on lines $x^{19}$—$x^{19}$ of Figure 18.

Figure 20 is a transverse section on lines $x^{20}$—$x^{20}$ of Figure 19.

Figure 25 is a detailed side elevation of the front base of the machine showing the automatic tripping mechanism.

Figure 26 is a plan view thereof.

Figure 27 is a fragmental front elevation of the parts shown in Figures 25 and 26.

Figure 28 is a transverse vertical section taken on lines $x^{28}$—$x^{28}$ of Figure 25.

Figure 29 is a perspective view of several of the clutches controlling the timing of the machine.

Figures 4, 5, 6, 7, 8 and 9 are about twice the scale of Figures 1, 2 and 3.

Figure 1:
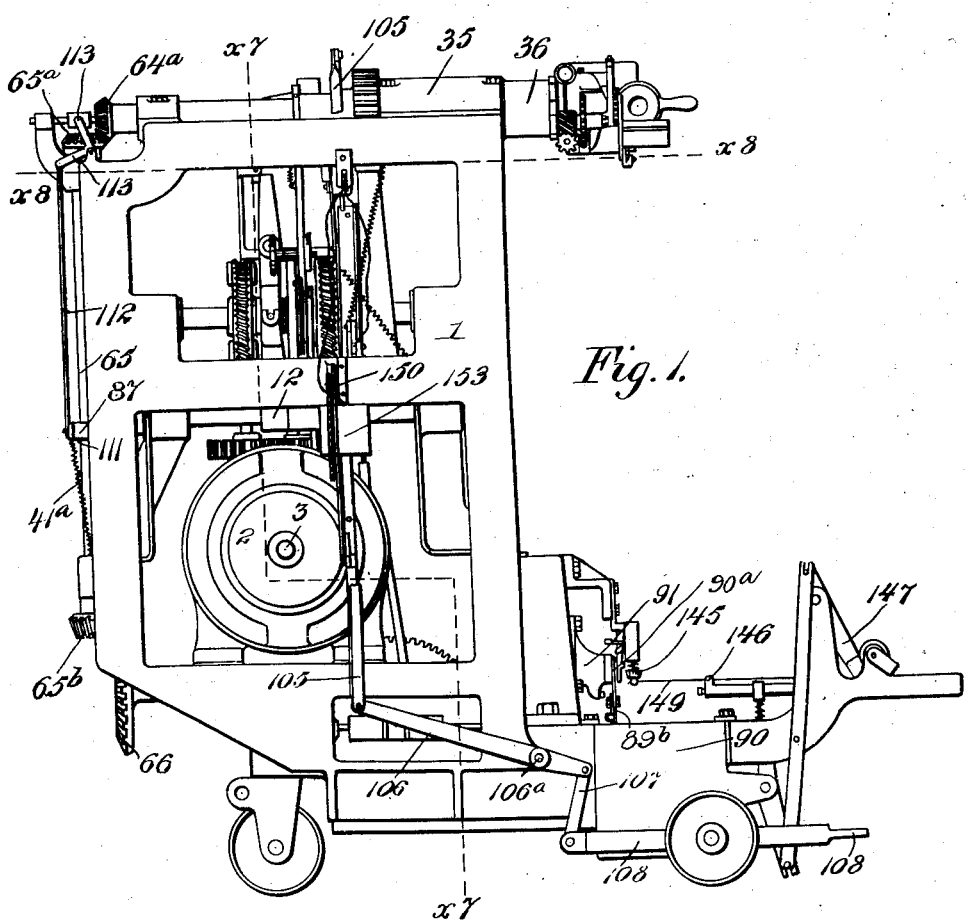
Figure 1 is a right side elevation of a machine constructed in accordance with this invention, the parts being in their normal position.
Figure 2:
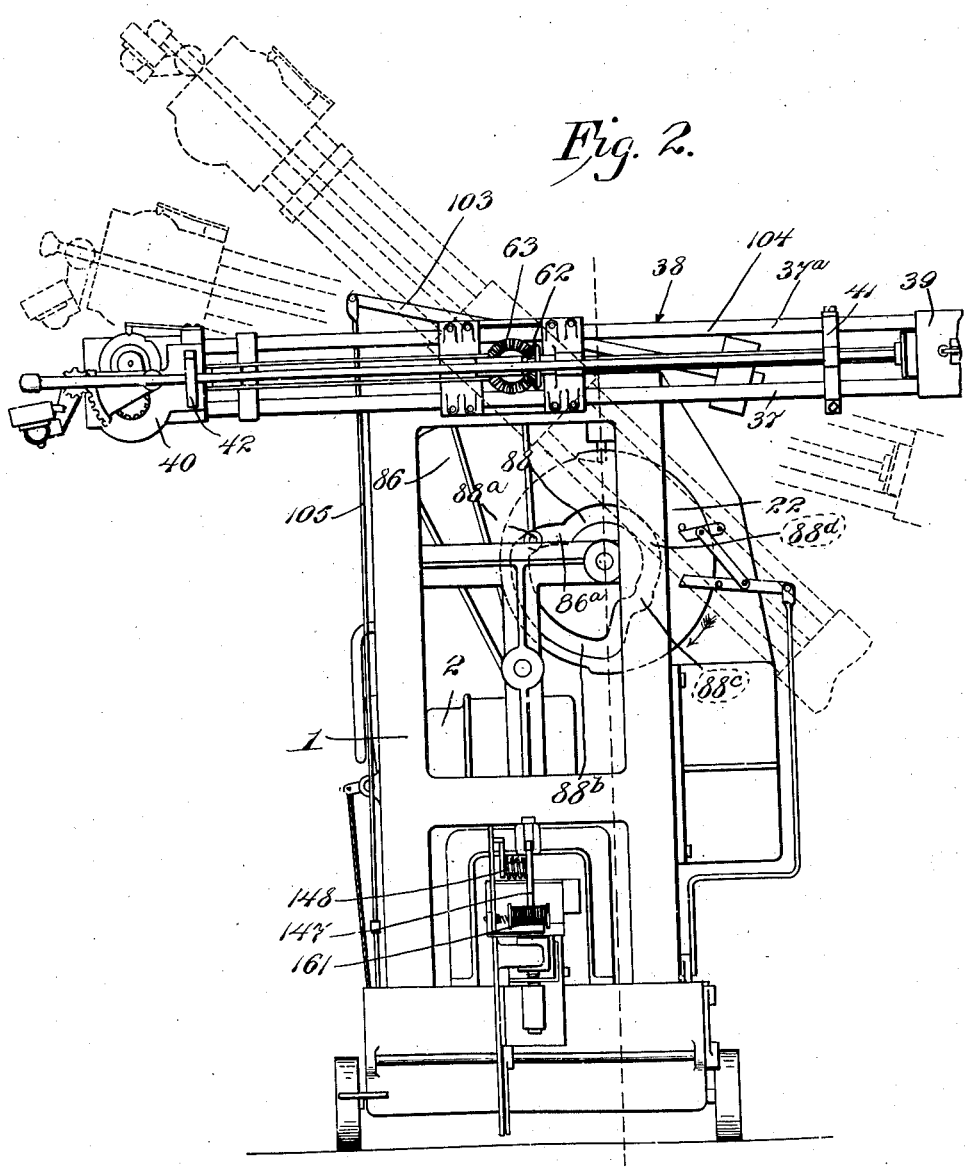
Figures 2 and 3 are front elevations thereof, the machine being shown in its normal position and elongating position respectively.
Figure 3:
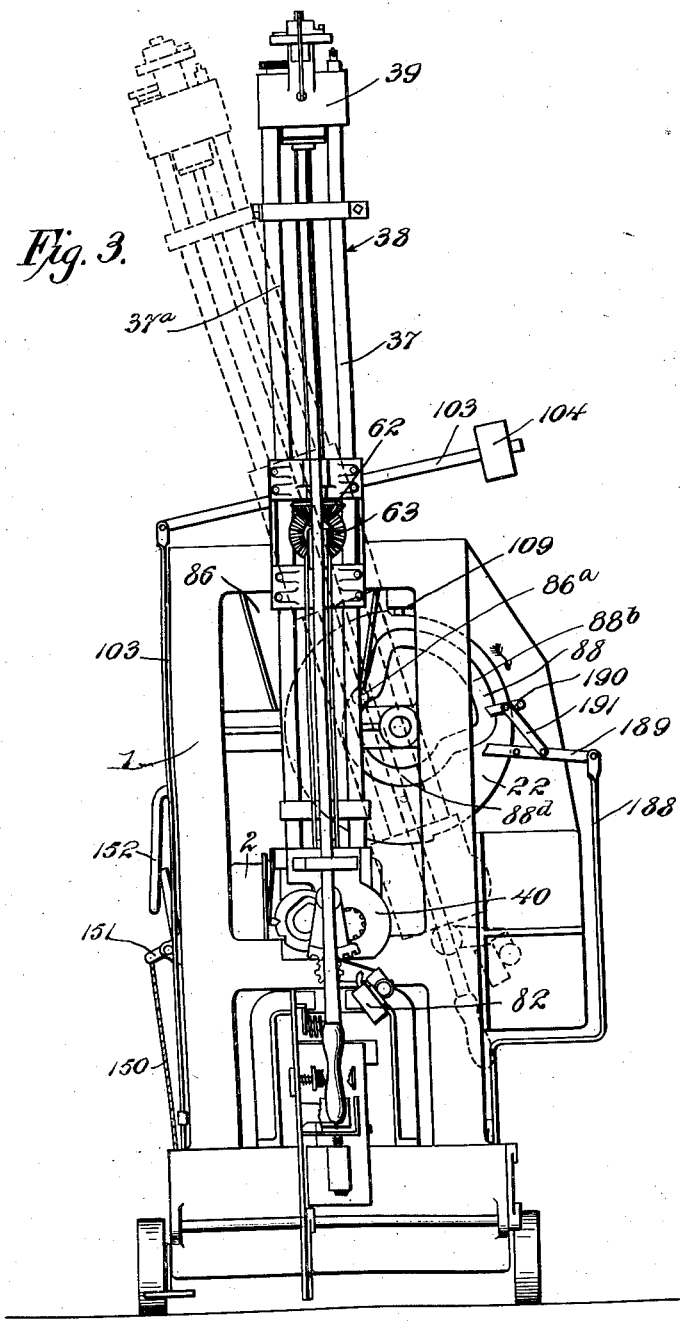
Figure 5:
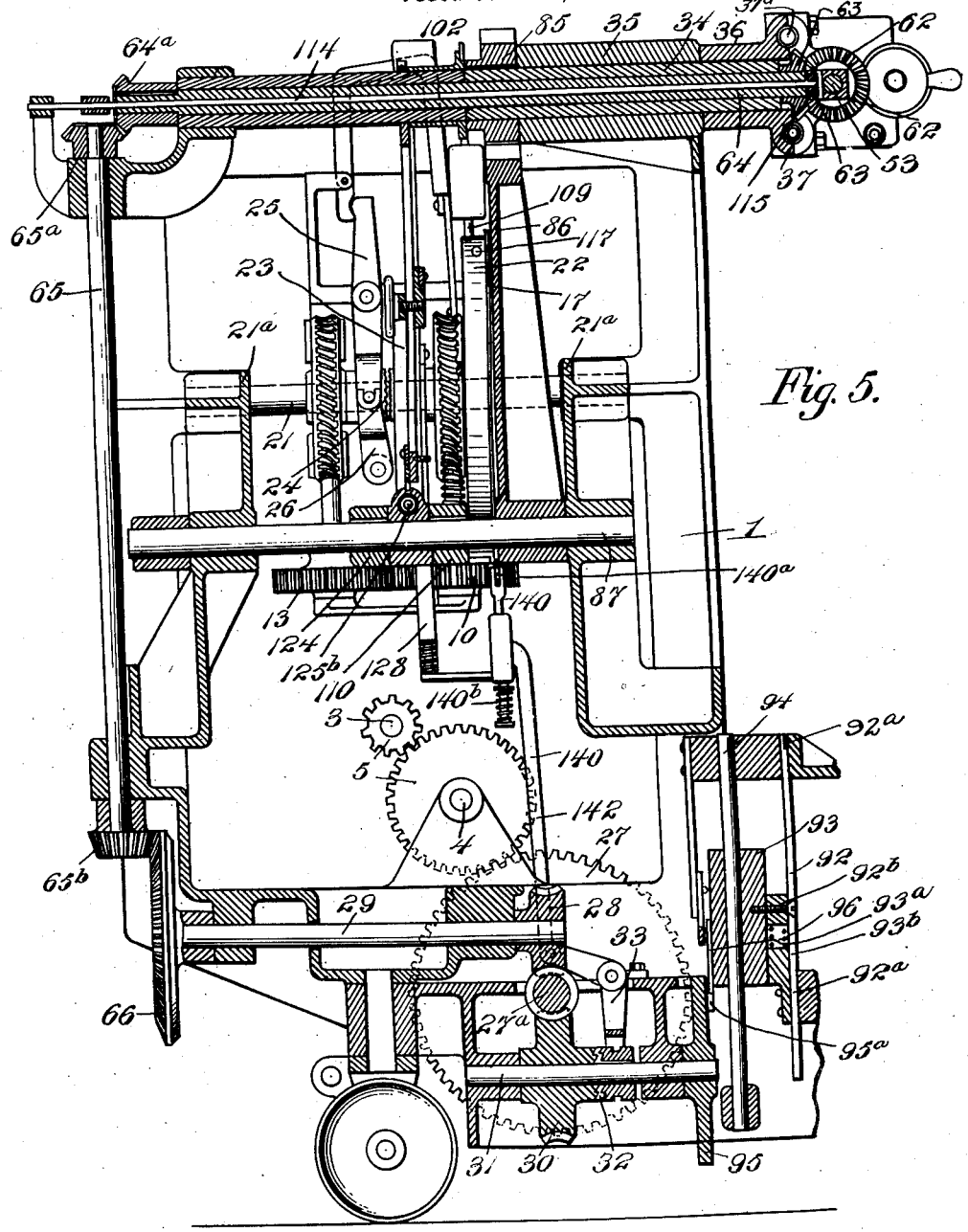
Figure 5 is a longitudinal vertical section on lines $x^5$—$x^5$ of Figure 4.
Figure 6:
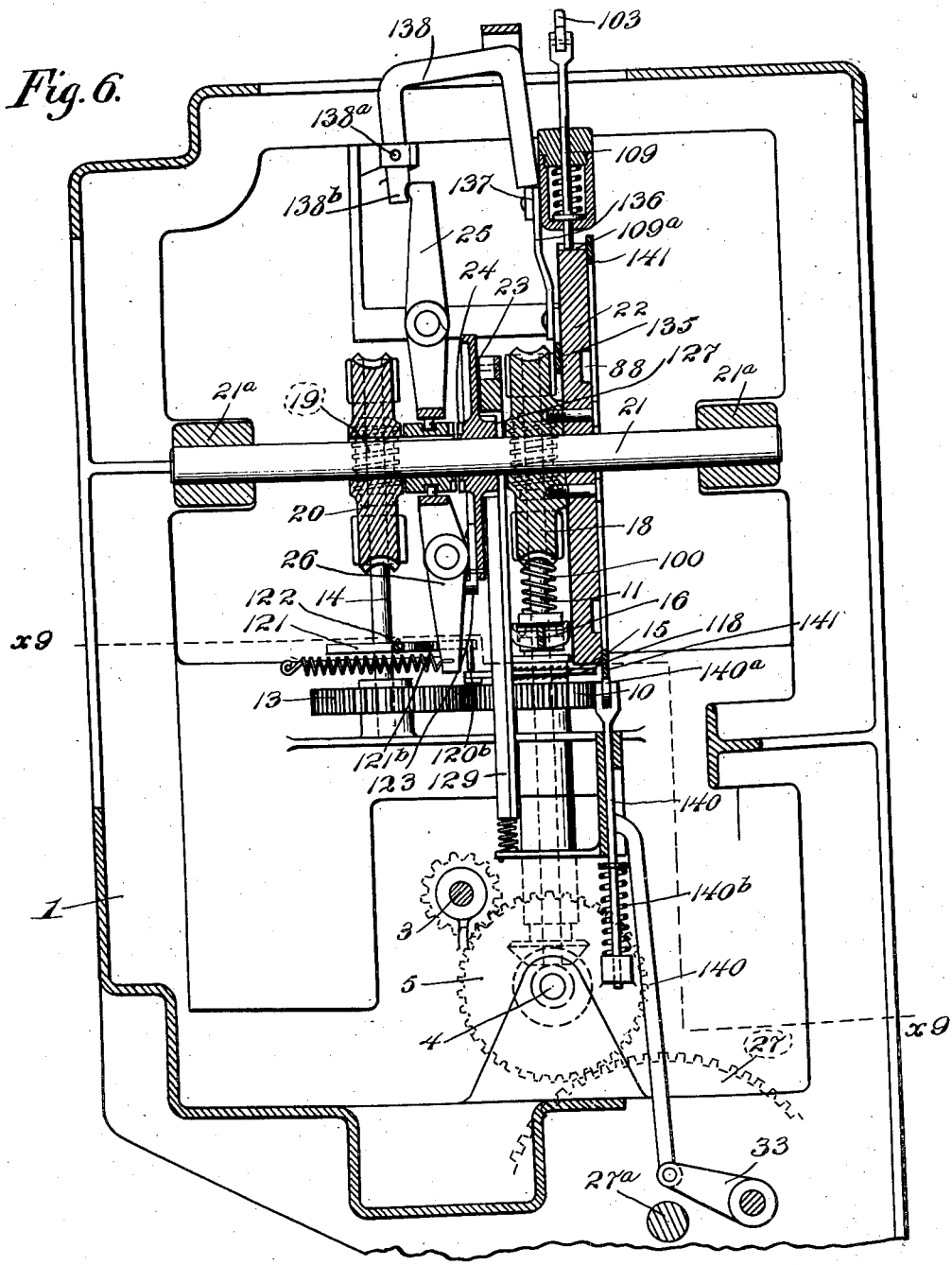
Figure 6 is a longitudinal vertical section on lines $x^6$—$x^6$ of Figure 4.
Figure 7:
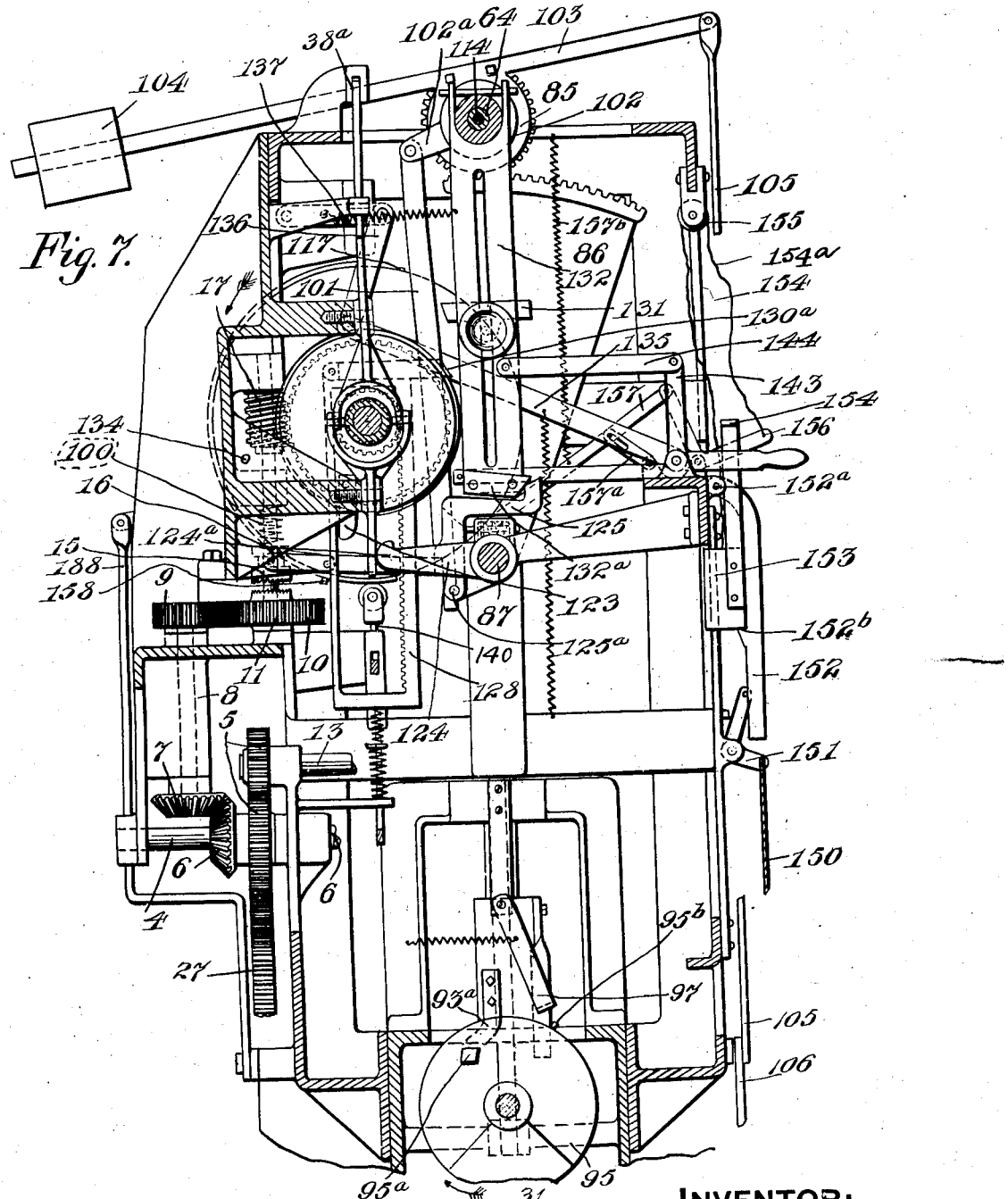
Figure 7 is a transverse vertical section on lines $x^7$—$x^7$ of Figure 1, looking towards the front.
Figure 8:
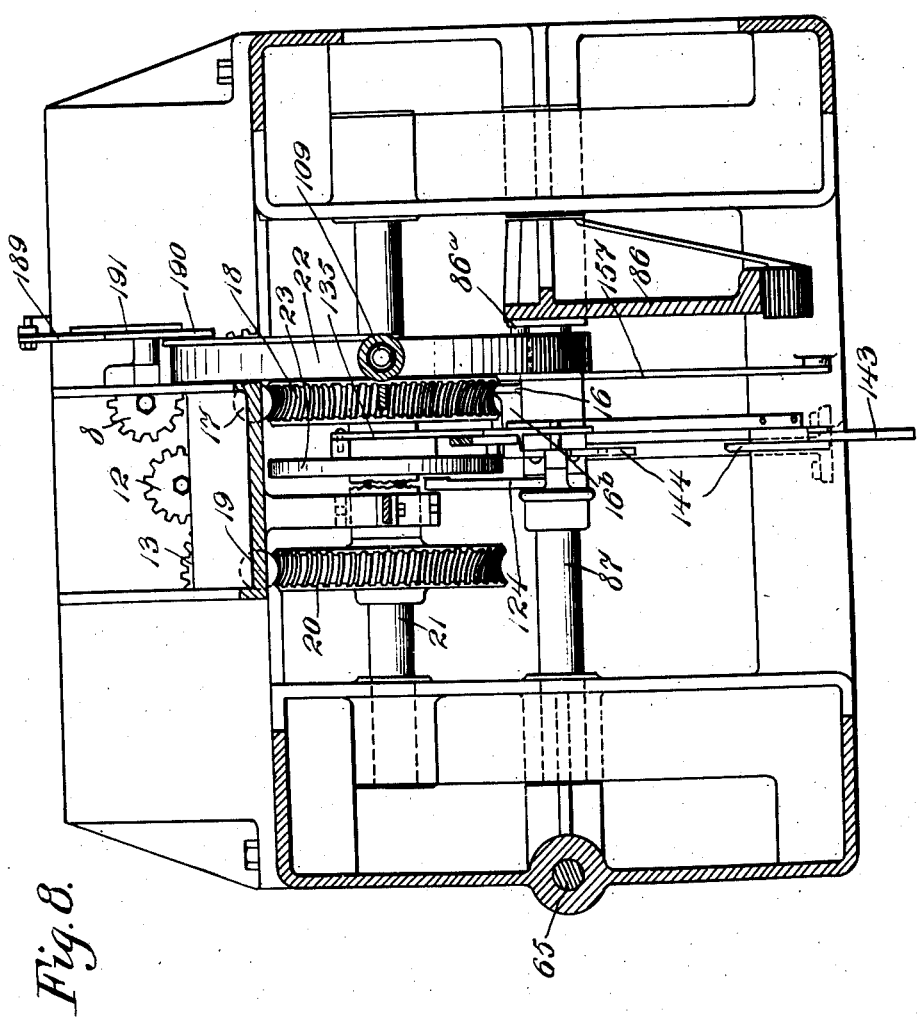
Figure 8 is a horizontal section on lines $x^8$—$x^8$ of Figure 1.

The main frame, the several parts of which are marked 1, contains the motor 2, (Figs. 1 to 3) which through its transverse main shaft 3 and counter-shaft 4, geared together by the pinions 5, (see Figs. 5 to 7) drives the several parts to be hereinafter mentioned.

The counter-shaft drives (see Fig. 7) through a mitre gear 6 on its left hand end, a corresponding gear 7 fast on the lower end of a vertical shaft 8, the upper end of which has fast thereon a pinion 9, gearing with a gear 10, loose on the lower end of a vertical counter-shaft 11, the said gear 10 also serving, through the idler 12, to drive the gear 13 fast on the bottom of a second vertical counter-shaft 14.

The gear 10 may be made fast (see Figs. 6 and 7) to the shaft 11 by means of a clutch 15, controlled by a yoke lever 16, pivoted at 16ª in the main frame, and the shaft 11 has fast thereto a worm 17, gearing with a worm wheel 18, sleeved on a longitudinal shaft 21 carried in bearings 21ª in the main frame, so that said worm wheel is intermittently driven by the motor through the clutch 15.

The second vertical shaft 14 has fast thereon (see Fig. 6) a worm 19 gearing with a worm wheel 20 fast on the shaft 21, so that the worm wheel and shaft is constantly driven by the motor when the latter is running.

The worm wheel 18 has fixed thereto (see Figs. 5 and 6) in front thereof a cam wheel 22, while the shaft 21 has sleeved thereon a disk 23, driven from such shaft by the clutch 24, controlled by the two oppositely disposed yoke levers 25 and 26.

The gear 5 on the counter-shaft 4 also meshes (see Fig. 5) with a gear 27 on a horizontal transverse worm shaft 27ª, mounted in the base of the frame and gearing with a worm wheel 28 on a horizontal longitudinal shaft 29, which serves as the driver for the blow-pipe rotating, and the marvering and the air control mechanisms. The worm shaft 27ª further drives a worm wheel 30, sleeved on a horizontal and longitudinal counter-shaft 31, and adapted to be locked thereto by a clutch 32, whereby the shaft may be driven to actuate the mold manipulating mechanism, the clutch being controlled by a yoke lever 33.

Figure 4:
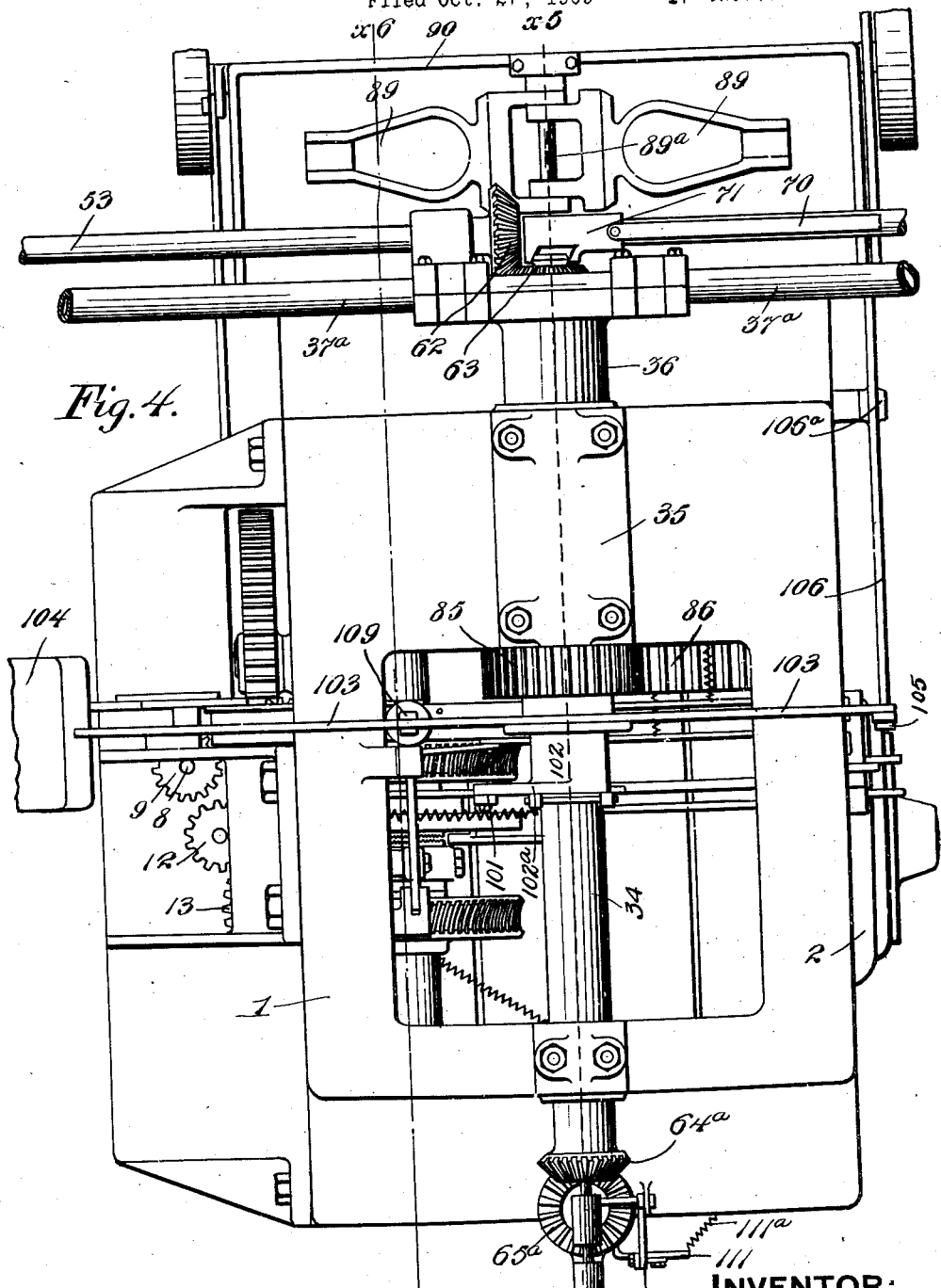
Figure 4 is a fragmental plan view of the machine, the ends of the blow-pipe frame and parts carried thereon being broken away.

A longitudinal horizontal tubular shaft 34 is carried (see Figs. 1, 4 and 5) in a bearing 35 on the top of the main frame and has keyed to its projecting forward end a two-part casting 36, divided transversely to the axis of the shaft, the parts of the casting receiving between them the central portions of the two rods 37 and 37ª, which are spaced apart and form part of a blow-pipe frame 38. The rods (Figs. 2 and 3) carry at their one (upper) end an air head casing 39, and at their (lower) other a casing 40, by which casing the ends of the rods are connected. The terms "upper" and "lower" here used have reference to the position of the frame when placed in the molding position by the rotation of the shaft 34.

Two blow-pipe rests are carried on the frame, the upper rest being formed by a notch in a cross head 41 carried by the frame rods 37, while the lower rest 42 is on the front face of the casing 40 and is provided with a latch piece 42$^a$ (see Figs. 13 and 14) by which the blow-pipe may be locked in the rest when inserted therein.

The air head casing 39 (Figures 17–24) which is hollow, is secured to the frame rods by the split bearings 39$^a$ and is provided, in the prolongation of the line of the axis of the blow-pipe when inserted in the blow-pipe rests, with a chuck adapted to receive the slightly tapering or chamfered upper end 43$^a$ of the blow-pipe 43 which is provided with circumferential series of recesses 43$^b$ near such end. The clutch consists of a cylindrical block 44, contained in a hollow cylinder 45 mounted in the casing, the block being provided at its lower end with a central bore 44$^a$ provided with a packing ring 44$^b$ into which the tapering end of the blow-pipe projects, it being held therein against accidental displacement by radial jaws 46, pivoted at 46$^a$ in radial slots in the chuck block, and having their inner ends pressed into the recesses of the pipe by springs 46$^b$ in the block. The jaws may be manually retracted for the purpose of placing or removing the pipe from the chuck by a turning ring 47 provided with spiral flanges 47$^a$ and held in place in the casing opposite the cylinder 45 by a cap 48, the flanges 47$^a$ bearing upon corresponding cams 49$^a$ upon a collar 49 which bears upon the outer ends of the jaws 46 to shove them rearwardly and thus move their inner ends, which projects forwardly from the pivotal points 46$^a$, outwardly.

The chuck block has a peripheral annular groove 50 into which the transverse bores 50$^a$ in the block open, such bores communicating with the base of the central bore 44$^a$ by the aperture 50$^b$. A port 51 in the wall of the cylinder 45 and a port 51$^a$ in the wall of the air head affords communication between the cavity formed by the annular groove 50, and the interior of the air head, the communication thus established being controlled by a poppet valve 51$^a$, the stem 51$^d$ of which is actuated by a crown cam 52$^a$ on a wheel 52, which wheel is mounted on top of the casing by being journalled on the projecting upper end of a shaft 53, which projects upwardly through the casing in a bearing 53$^a$ located centrally thereof, the opposite end of such shaft being mounted in the casing 40 at the other end of the blow-pipe frame. The wheel 52 is driven by a gear 52$^b$ fast thereto and meshing with an idler 54 mounted on the top of the air casing and driven by a pinion 55, fast on the end of the shaft 56 contained within the hollow rod 37 and actuated by mechanism to be hereinafter referred to.

The chuck block 44 has its rear end continued through the top of the air head and through the chuck cylinder 45 and has fast thereon the gear 57 which is in mesh with the pinion 58 mounted on a stud 58$^a$ on top of the air head, and fast with a gear 58$^b$, driven by a pinion 53$^b$ fast on the shaft 53, the pinion 58 and gear 58$^b$ being merely idlers.

The shaft 56 thus rotates the air valve cam wheel 52 which is properly shaped to admit, upon the intermittent rotation of the shaft referred to, a proper amount of air to the blow-pipe at proper times, while the shaft 53 rotates the chuck block and the blow-pipe that may be contained therein.

Air under suitable pressure is led into the casing 39 by an appropriate conduit 59, preferably flexible.

In order to permit the accurate control of the pressure in the gather after the pipe has been introduced into the machine and prior to the blowing, I place upon the side of the air head a relief valve 60 communicating with the annular groove 50 in the chuck body, the stem 60$^a$ of the valve being controlled by a tappet lever 60$^b$ pivoted at 61$^c$ on a bracket 61$^d$ projecting from the casing, one end of such tappet being pivoted to the stem and the opposite end thereof being guided in a slotted pin 61$^e$ carried in the end of the shaft 53 and being adapted to be struck by a cam plate 52$^c$, adjustably secured on the outer face of the cam wheel 52, to depress the stem and hold the valve open from the time the blow-pipe is introduced until the blowing and also after the blowing has taken place. The opening of the valve during the first named period prevents premature swelling of the bulb by the compression of air which would otherwise occur upon the insertion of the blow-pipe in the chuck, and be occasioned by the heating of the entrapped air in the gather, while the opening of the valve at the last named period prevents the reduction of air pressure which would occur after the blowing due to the cooling of the entrapped air.

The bracket 61$^d$ also carried an end thrust bearing for the chuck block in the form of a coned set screw 61$^f$.

The shaft 53 which as before stated has its bearings for its opposite ends in the casings 39 and 40 is located between and in front of the frame rods 37—37$^a$ of the blow-pipe frame, its central portion being steadied (see Figs. 4 and 5) in the split casting 36, by which the frame is mounted on the tubular shaft 34, and has keyed thereto, adjacent to its bearings in such casting, a mitre gear 62, meshing with a corresponding gear 63 on the front end of a tubular shaft 64 contained within the shaft 34, which shaft 64 is driven by mitre gears 64ª and 65ª from the vertical jack shaft 65, driven through the bevelled gears 65ᵇ and 66, the latter of which is on the horizontal shaft 29 before described, whereby the shaft 53 is constantly driven during the operation of forming a bulb in the machine.

The constantly driven shaft 53 has sleeved (see Figs. 10-15) thereon near the lower end thereof a worm 67, the worm and shaft being capable of being locked together by a clutch 68 pressed to close by a spring 69.

The movable member 68ª of the clutch 68 is provided with an annular groove 68ᵇ engaged by pins 70ª on the lower ends of links 70, the relative size of the groove and pins being such that the parts are capable of some movement in respect to each other. The upper ends of the links are secured to the lateral sides of a block 71, sleeved upon and capable of longitudinal movement on the shaft 53. The clutch 68 is disengaged by an upward movement of the block 71 and reengaged by the spring 69 upon a downward movement of the block, the loose connection afforded by the enlarged groove 68ᵇ permitting this downward movement at all times and even when the angular relation of the two parts of the clutch is such as to prevent them from immediately going into mesh. The links 70 are guided intermediate their ends by the sliding block 72.

The casing 40 upon the lower end of the blowpipe frame affords a support for the marverer and its actuating mechanism and other parts to be hereinafter described and is secured to the rods 37—37ª of the frame by a split clamp 40ª. As stated the shaft 53 has a bearing in such casing and the worm 67 on the shaft meshes with a worm wheel 73 on the front end of a transverse shaft 73ª carried in the casing; the rear end of which has fast thereon a pinion 73ᵇ meshing with a gear 74 fast to the worm 74ª, meshing with a worm wheel 75 on the lower end of the shaft 56, which latter, as before stated, is contained within the frame bar 37 and drives from its upper end the air cam.

The pinion 73ᵇ further meshes with a gear 76 fast on the rear end of a transverse shaft 76ª, which is mounted in the casing, the front end of the shaft projecting through the front of the casing and having fast thereon a disk 77 provided in its outer face with a cam track 78 in which runs a roller 79ª projecting from the side of a rack sector 79, pivoted at 79ᵇ to the casting 40. The rotation imparted to the disk 77 from the shaft 53 by the gearing 67, 73, 73ᵇ and 76 above described results in an oscillation of the sector through a limited arc around its pivot 79ᵇ. The rack upon the sector meshes with a gear 80 mounted upon a stud 40ᵇ on the casting 40 and the oscillation of the sector is thus imparted to the gear, which has rigidly attached thereto an arm 81, carrying a marvering plate 82. The connection between the arm 81 and plate is by preference made by two adjustable joints, the one 81ª located immediately under the center of the plate whereby the inclination of the plate to the axial line of the blow-pipe may be varied and the other 81ᵇ located at a distance therefrom, whereby the plate may be moved as a whole more or less towards and away from such axial line, these permitting the variation in the position of the marverer in respect to the blow-pipe which are desirable in practice.

The marverer itself in use should not be allowed to exceed or fall below a certain temperature and I have therefore shown it as a hollow casting or plate, provided with pipes 83 by which water or other fluid may be introduced into or removed from its interior, but it will be understood that any other means, whereby the temperature of the marverer at the point or points where the gather is brought into contact therewith is controlled, may be employed.

It will be seen that the beveled gear 62 on the shaft 63 is the means by which motion is imparted to the various instrumentalities on the blow-pipe head. Of these the chuck is driven from the shaft without the interposition of any clutch and is thus in rotation when the shaft is rotated while the gears 67 and 73 through which motion is imparted to the air valve cam and marverer is driven through the clutch 68, and only received motion when such clutch is closed. It will be further noted that the motion of the marverer is further intermitted by the shape of the run of the marvering cam, so that at times such sector is stationary, even though the shaft 56 and the air valve cam driven thereby are in motion.

In the normal position of the machine the clutch 68 is disengaged and the stud 79ª of the sector is in the run 78ª of the cam track 78. When the clutch is engaged the disk 77 is rotated, whereby the sector will be depressed, lifting the marverer towards the blow iron, the marverer staying in this position while the stud is in the circumferential run 78ᵇ of the track, the stud then entering the run 79ᶜ, throwing the marverer away from the pipe. The disk 77 is temporarily arrested when the stud is at the end of this run by the disengagement of the clutch 86, this occurring as will be hereinafter explained at the elongation of the gather, and the further movement of the disk then carries the stud in to the circumferential run 80ᵈ holding the marverer stationary in respect to the blow-pipe for the molding period, after which the disk will be arrested by the final opening of the clutch at the end of the cycle of operation, restoring the parts to their normal position. To steady the disk in this position a spring 84 is attached to the casting 40 and is adapted to engage a notch 77$^b$ in the periphery of the disk.

The shaft 34 carrying the blow-pipe frame has (see Figs. 4, 5 and 7) a gear 85 thereon, engaging a quadrant 86, sleeved on a longitudinal shaft 87 mounted centrally of the main frame, and oscillated through a limited arc around the same by means (see Fig. 2) of a stud 86$^a$ thereon engaging a cam run 88 in the front face of the cam disk 22. This disk makes a complete revolution for each cycle of the machine and the run is provided with a lifting portion 88$^a$ by which the blow-pipe frame is at the commencement of the rotation of the cam wheel moved from its normal horizontal position in such a way that its marvering end is lifted (see dotted positions Fig. 2); with a circumferential portion 88$^b$ which holds the blow-pipe frame stationary in this lifted position during a period of the cycle of the machine (this position) which aids in the proper distribution of the gather, corresponding generally to the marvering period or periods in which the marverer is held up towards the blow-pipe, (see upper dotted position Fig. 2) and with a portion 88$^c$ by which the frame is swung, such portion being so shaped as not only to cause the frame to assume a vertical position with the marvering end down but to oscillate the frame past such vertical position (see dotted lines position Fig. 3), for "swinging." The motion of the disk 22 is arrested with the stud in engagement with such portion of the cam track as will cause the blow-pipe frame to be vertical, this being due to the disengagement of the main clutch and is to permit the elongation of the bulb, after which the motion of the disk is resumed and the stud enters the circumferential run 88$^d$ by which the frame will be held stationary to permit the molding. Finally the marvering end of the blow-pipe frame is again lifted by the lifting portion 88$^a$ of the run and the blow-pipe frame returned to the horizontal position the disk stopping with the stud in the run portion 88$^a$ intermediate of its ends.

The mold 89 is of the type usual in blowing articles such as lamp bulbs, although the manner in which it is mounted and actuated differs in many respects from the common practice, and is so located that when closed it is properly centered in respect to the blow-pipe carried by the blow-pipe frame when the latter is in its vertical position.

It consists of two parts (see Figs. 1, 5 and 28) hinged together on a pin 89$^a$ projecting across and near the top of the tank 90, which is attached to the front of the main frame at the bottom thereof, the two mold halves being each connected by a link 89$^b$ to the head 90$^a$ of a bracket 91 carried on a vertical bar 92, running in guides 92$^a$ in the front base of the main frame, and connected with the cross head 93 running on a guide rod 94, the cross head having a plate 93$^a$ on the rear face thereof which is lifted by a lug 95$^a$ on the front face of the wheel 95 on the forward end of the shaft 31. The attachment of the bar 92 to the cross head is not however rigid, but is made through the interposition of a spring 96, which rests upon a driving projection 93$^b$ on the cross head and under a corresponding projection 92$^b$ on the bar. With this construction when the parts are in their normal position, that is, when the cross head is down and the mold parts extended horizontally on each side of their pin, the rotation of the wheel 95 resulting from closing the clutch 32, will lift the cross head and with it the bracket and the links, thus closing the mold sections. The interposition of the spring connection 96 permits the adjustment of the parts to be such that the mold parts may at the proper time be firmly closed without unnecessary fine work and without endangering breakage of the mold closing mechanism in case the blow-pipe end or the bulb being blown should become accidentally displaced in respect to the mold during the operation of the machine. The clutch 32 is closed long enough to cause a complete rotation of the mold wheel, but upon the lifting of the cross head the latter is caught by a spring latch 97, (Fig. 7) which holds it in its raised position for the period necessary to complete the molding, after which the latch is struck by a peripheral projection 95$^b$ on the wheel and releases the cross head, after which the mold and connecting parts are restored to normal position by gravity.

As further means for ensuring a position closing of the mold sections each of the links 89$^b$ has (Fig. 28) thereon intermediate of its length an ear 89$^c$ between which ears is stretched a spring 98, by which the lower ends of the links and thus their points of attachments with the molds are drawn together.

In order to steady the blow-pipe frame during the molding, the marverer casing 40 has slidingly attached to its rear face (see Figs. 11 and 13) a plate 99, pressed by a spring 99$^a$ towards the bottom, and having a notched lower edge 99$^b$ into which the top of the rod 92 is lifted upon the closing of the mold, which takes place after the blow-pipe frame has been swung into its vertical position.

A mold mechanism, and its actuating means; a blow-pipe frame and actuating means for moving it in a vertical plane for "swinging" the gather and positioning it for elongating and molding; a marvering mechanism and its actuating means; a blowpipe rotating mechanism and its actuating means, and an air controlling mechanism and its actuating means, all driven from the main motor, have been described above, the last three instrumentalities being located upon the blow-pipe frame. There will now be described means whereby the actions of these parts are so related to each other that, upon the closing of the clutch 15 by the operator after the movement of the motor, and the introduction of the blow-pipe into its supports, the swinging of the frame and the proper operation of the marverer, of the air valve and of the mold mechanism follow in proper sequence and all parts are returned to normal position and relation without further attention of the operator, this being accomplished in part by the automatic action in proper order of the main clutch 15, the combined marvering and blowing clutch 68 and the mold clutch 32.

Figure 9:
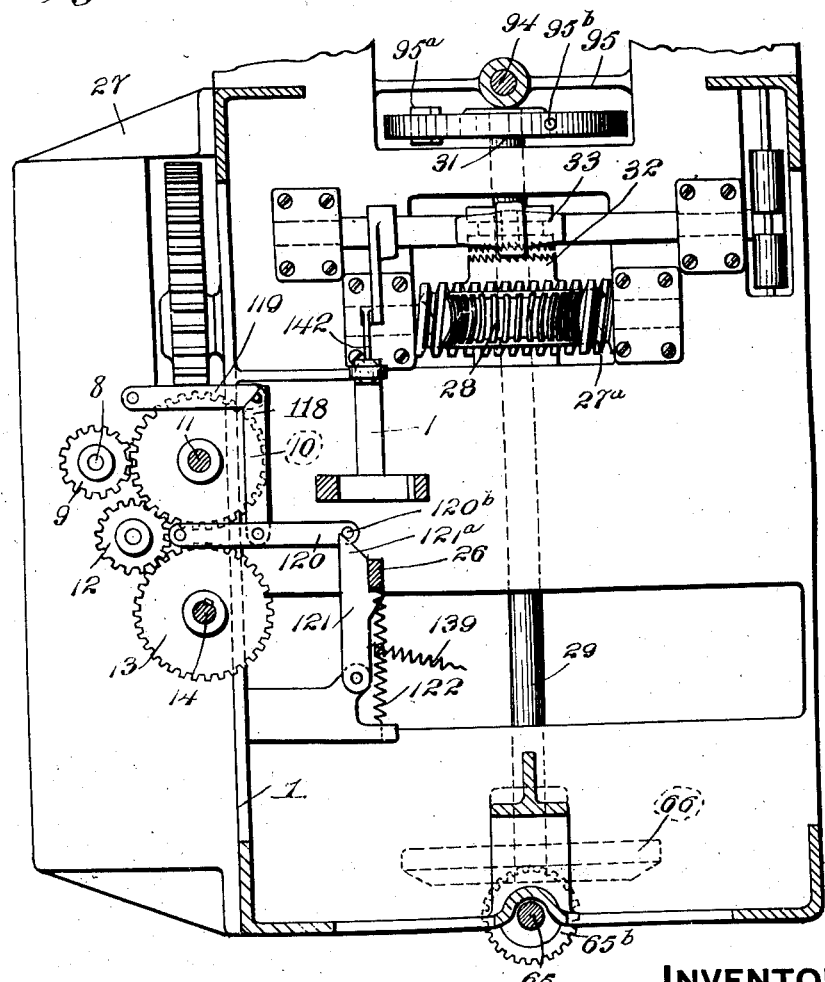
Figure 9 is a horizontal section on lines $x^9$—$x^9$ of Figure 6.
Figure 21:
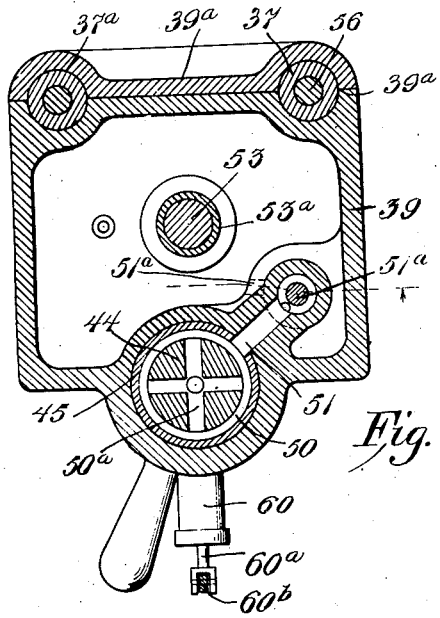
Figure 21 is a transverse section on lines $x^{21}$—$x^{21}$ of Figure 19.
Figure 22:
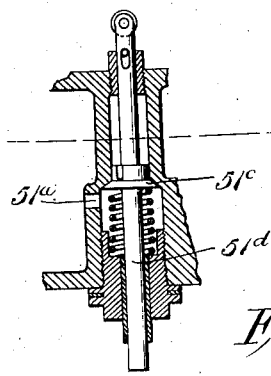
Figure 22 is a detail of the relief valve.
Figure 23:
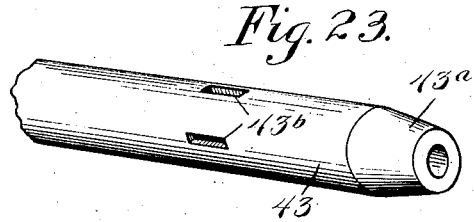
Figure 23 is a perspective view of the end of a blow-pipe adapted to be used in connection with the machine here described.
Figure 24:
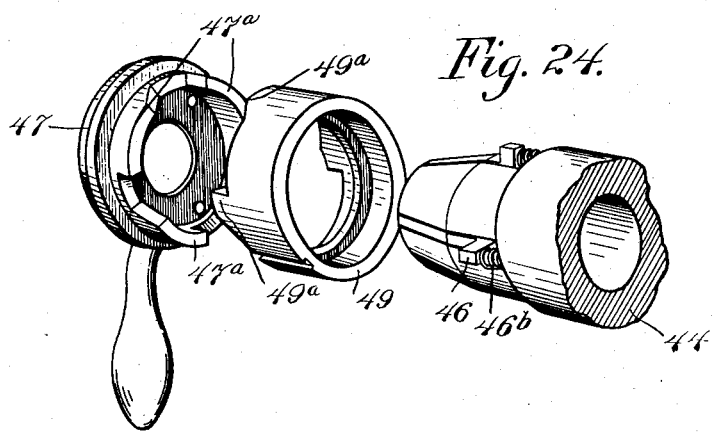
Figure 24 is a perspective view of certain of the chuck parts showing the same separated for the purpose of illustration.

The main clutch 15 (see Fig. 29) is pressed to close by a spring 100, the yoke lever 16 serving to disengage the clutch parts and being pivoted intermediate of its length at 16ª, the end (right hand) of such lever opposite to that which engages the clutch having a finger 16ᵇ projecting therefrom longitudinally of the machine, which is held normally depressed by engaging under a shoulder 101ª on the lower end of a link 101, the upper end of which is hung from an arm 102ª (see Figs. 4, 5 and 7) on a collar 102 sleeved on the shaft 64, on which collar is carried a lever 103 provided with a counterweight 104 located on the same side of the shaft 34 as is the arm 102ª, whereby the sleeve is normally so held that the shoulder 101ª on the link 101, attached thereto depresses the right hand end of the yoke lever 16 and thus lifts the left hand or clutch actuating end thereof, against the tension of the spring 101 and holds the clutch open. The arm of the lever 103 opposite the weight 104 is attached to a link 105 the lower end of which is attached to the rear end of a lever 106 pivoted (Fig. 1) intermediate its length as at 106ª to the frame 1, and having its forward end connected by a link 107 to the rear end of a foot lever 108 also intermediately pivoted to the frame of the machine and extending to the front and on one side of the mold tank, where it is provided with a pedal 108ª, upon the depression of which, after the inserting of the blow-pipe in the blow-pipe frame, the weight 104 and the link 101 will be lifted, permitting the spring 100 to close the clutch 15, and thus causing the motor, which is kept running during the period the machine is to be used, to drive the cam wheel 22. The initial movement of the wheel 22 locks the weight in its lifted position, this being accomplished by a spring pressed pin 109 (Figs. 5 and 6) which is guided in the frame 1 and connected to the lever 103, the lower end of the pin normally resting in a recess 109ª in the periphery of the wheel 22. The pin is lifted out of this depression when the weight of the lever is lifted and the rotation of the wheel carries an imperforate portion of the periphery thereof under the pin. The clutch is thus locked closed independently of the pressure of the foot of the operator, which may be then released without affecting the proper function of the parts, which will then be actuated in a predetermined order until the machine has completed the whole cycle of movement attendant upon its operation. The marvering end of the blow-pipe frame is also lifted on the initial movement of the disk by the lifting run 88ª of the cam way 88 on the wheel. A stud 16ᶜ (Fig. 29) on the right hand end of the clutch lever 16 is engaged by a slot 110ª in a crank 110 fast to the shaft 87, so that the finger 16ᵈ when released by the link 101 and lifted by the clutch spring, rocks the shaft 87, which has fast thereon at its rear end a crank arm 111, normally held depressed by a spring 111ª, and connected by a link 112 to the horizontal arm of the bell crank lever 113 (Figs. 1 and 4) pivoted at the top of the frame to vibrate in the longitudinal plane of the machine. The other, or vertical, arm of the bell crank lever is connected to the rear end of a rod 114 (see also Fig. 5) located and sliding within the tubular shaft 64 contained in the shaft 34 of the blow-pipe frame, the forward end of such rod terminating (Figs. 4, 14 and 16) in a button 115 in the form of two cones placed base to base and contained in a slot 116 in the block 71 mounted to slide longitudinally on the shaft 53 in the blow-pipe frame, the two side walls 116ª and 116ᵇ of the slot being diagonal to the axis of the frame in such a way that the pressure on the wall 116ª due to the backward movement of the button 115 slides the block 71 toward the marvering end of the frame, and as the block is connected with the combined marvering and air clutch 68 by the links 70 and permits the spring 69 to close such clutch, thus rotating the worm 67 from which the marvering mechanism and the air valve cam are driven. It will be seen that such clutch is directly thrown in by and immediately upon the depression of the pedal, resulting in such rotation of the cam 77 as will cause the arm 79 to swing on its stud 79ᵇ to lift the marvering plate towards the gather of glass on the blow-pipe resting in the supports 42 and to again move the marverer away from the glass, the blow-pipe frame being also during the movement of the cam wheel 22 directly resulting from depressing the pedal moved upwardly from its horizontal and then downwardly to a vertical position by the cam track 88 and also vibrated slightly past such vertical position to swing the gather. This movement of the wheel 22 causes (Figs. 6, 9 and 29) a peripheral pin 117 thereon to slide down the bevelled face 118$^a$ on the front end of a longitudinal bar 118 which has its front end carried by a link 119 and its rear end connected to a lever 120, pivoted at its left hand end at 120$^a$ in the main frame to move in a horizontal plane. The right hand of such lever is thus swung rearwardly of the machine and is provided with a pin 120$^b$ which in the rearward movement of the said end of the lever, rides upon the bevelled face 121$^a$ of the forward end of a latch 121, throwing the latter towards the left. This movement of the latch causes the shoulder 121$^b$ thereon to become disengaged from the lower end of the yoke lever 26 behind which it was located, permitting the spring 122 attached to such lever to draw such end rearwardly, thus throwing the clutch 24 into gear and causing the constantly driven shaft 21 to start movement of the disk 23. This disk 23 has pivoted thereto an arm 123 extending outwardly therefrom between stops 123$^a$ and 123$^b$, the arm contacting in the rotation of the disk and at the proper time after the initiation of its movement with the left hand bevelled end 124$^a$ of a finger 124, keyed to the shaft 87 and extending therefrom substantially parallel with and in the rear of the crank 110, depressing the same and rocking the shaft back to normal position. This through the link 112 and bell crank 113 projects the rod 114 towards the front of the machine whereby the slide block 71 will be pushed by the pressure of the button 115 on the wall 116$^b$ towards the air head end of the blow-pipe frame, thus disengaging the combined air and marvering clutch 68 and arresting the movement of the marverer and air valve. The arm 123 is so positioned on the disk 23 that during the interval between the closing of the marvering clutch on the depression of the pedal and its opening by the disk 23, such rotation of the marvering cam 77 will take place as will cause the marvering plate to move from its normal position to its position during the marvering and then away from the blow-pipe, the disconnection of the marvering clutch stopping the movement of the plate while the latter is in the last named position and to prevent interference thereof with the mold mechanism, the marverer reaches its last named position before the swinging of the blow-pipe frame carries it into proximity to the mold.

The rocking of the shaft 87 by the arm 123 as above described acts through the crank 110 and its connection with the lever 16 to again open the main clutch 15 through which the cam wheel 22 is driven, thus stopping the blow-pipe frame in a vertical position over the mold. It will be noted however that the opening of the main clutch at this time does not arrest the motion of the disk 23 which is driven through the clutch 24, which was closed by movement imparted through the main clutch but which is now held closed by its spring 122.

The arm 123 soon passes from off the finger 124 but the shaft 87 is prevented from rocking from its normal position by the engagement of the finger 16$^b$ by a latch 125. This latch is pivoted at 125$^a$ and is pressed towards the left by a spring 125$^b$ and is provided with a shoulder 125$^c$, which when the parts are locked lies above the finger 16$^b$. This locked relation of the parts also exists before the depression of the pedal to start the operation of the machine but is broken by the latter, as the link 101 actuated by the pedal is provided with a stud 126 taken under a bevelled shoulder 125$^d$ on the side of the latch, and acting when the link is lifted to throw back the latch. After throwing back the latch the stud passes by the bevelled shoulder and loses control, but not before the latch has released the yoke lever 16, which it does not again engage until the latter is depressed in the manner before described by the arm 123.

The locking down of the yoke lever 16 results in the main clutch being open for a period during which the blow-pipe frame is held stationary in a vertical position and further holds the rock shaft 87, due to its connection with the yoke lever, in such position as will hold the marvering and air clutch open. This provides a period in which the glass can elongate or draw out under the influence of gravity.

A pinion 127 is secured to the forward side of the disk 23, and meshes with a rack 128 secured to the inside of a vertical member of a hollow frame 129 and the rotating of the pinion due to the rotation of the disc lifts the frame so that, at a period after the blow-pipe has been vertically positioned as before described, a cam face 130$^a$, on a latch 130, pivoted on the frame 129 strikes a block 131 vertically adjustably on a link 132 pendant from the shaft 34 to swing in a transverse plane, the cam face swinging the link 132 towards the right and away from the shaft 21. The lower end of the link is provided with a bevelled lower right hand corner 132$^a$, which when the link is swung as described rides upon a bevelled face 133$^a$ upon the right hand end of the latch 125, thereby throwing the latter to release the finger 16$^a$, permitting the spring 110 to reengage the main clutch, the shaft 87 being simultaneously rocked by its spring 111$^a$ and its connection with the yoke lever 16 to engage the marvering clutch.

As a result of these reengagements the cam 22 resumes its rotation but the blowpipe is not immediately swung thereby due to the fact that the stud of its actuating quadrant 86 is in the concentric run 88$^d$ of the cam track of the cam. In a similar manner the marvering plate remains stationary, as the stud of the actuating segment thereof is in the concentric run 80$^d$ of the cam 77. The air valve cam 52 driven through the clutch acts upon the air valve and admits air into the blow-pipe in the desired volume, determined by the shaping of the cam finally cutting off the air. At about the time the air is cut off from the blow-pipe the blow-pipe frame, marverer and cams 22 and 77 have so far rotated as to bring their final runs 88$^a$ and 77 into action to restore the blow-pipe frame to normal position and to cause the marvering plate to approach the blow-pipe.

The cam wheel 22 has (see Fig. 7) a pin 134 on its rearward face which on the rotation of the wheel contacts with the lever 135 transversely hung on the frame of the machine and connected by the link 136 to the lever 137. The lever 137 underlies one end of a U-shaped lever 138 mounted over and straddling the wheel 22 and 23 and being pivoted at 138$^a$, the opposite end 138$^b$ thereof lying behind the upper yoke lever 25 of the clutch 24, so that when the lever 135 is lifted by the pin the lever 138 is rocked and the yoke lever 25 moved to disengage the clutch, which is caught in this disengaged position by the latch 121, the latter being thrown to engage the lever yoke 26 of such clutch by its spring 139.

The disk 23 thus freed from the driving influence of the worm wheel 20 by the disengagement of the clutch 24 drops under the weight of the frame 129 drops back to normal position. The arm 123 on the disk swings on its pivotal mounting past the finger 124, which is at this time raised, and the latch 130 slips past the block 131.

A roller 140$^a$ (Figs. 5 and 7) upon the upper end of a rod 140 guided for vertical movement in the main frame is normally held depressed by a peripheral cam track 141 (see Fig. 29) on the main cam wheel 22, but the rotation of such wheel following the reengagement of the main clutch through the action of the timing clutch 24, brings a cut away portion 141$^a$ of such cam over the roller, which is then lifted by its spring 140$^b$, and as the roller is connected by the connecting rod 142 with the yoke lever 33 of the mold clutch 32, the latter is closed and the wheel 95 is driven by the motor. This results in a lifting of the mold cross head 93, and a closing of the mold, the cross-head being caught in its raised position by the latch 97, which on the continued rotation of the wheel 95 is disengaged as before described. Before the wheel 22 has made a complete rotation and is back to its normal position the roller 140$^a$ is again depressed by the cam track 141 and the mold closing clutch again opened.

Simultaneously with the opening of the mold, the roller of the blow-pipe frame actuating segment enters the lifting part 88$^a$ of the cam run on the main cam wheel 22 and swings the blow-pipe to horizontal position.

The rotation of the main cam wheel 22 finally brings the recess 109$^a$ therein under the supporting pin 109 for the lever 113 and permits the latter to drop, the shoulder 101$^a$ of the link depressing the finger 16$^b$ of the yoke lever 16 of the main clutch 15 and arresting the motion of all parts which are not in continued operation, such parts being now in normal position.

The blow-pipe with the blown bulb thereon can then be removed by the attendant and another blow-pipe with the gathering of the glass thereon may be inserted.

The operation of this machine briefly described is as follows, reference being had to the foregoing description of the manner in which the results specified are obtained.

The operator places a blow-pipe with a gather thereon in the blow-pipe supports on the blow-pipe frame and inserts the end of the blow-pipe in the blow-pipe chuck, by which it will be engaged and rotated and depresses the pedal 108$^a$, whereupon the spring 100 closes the clutch 15, and the motor drives the cam wheel 22, the initial rotation of which locks the weight 104 in the position into which it was lifted by the pedal, permitting the clutch to remain closed. The depression of the pedal further causes a backward movement of the button 115 to close the combined marvering and air clutch 68, whereby the marverer will be moved towards and then away from the gather. The rotation of the cam wheel 22 swings the gather end of the blow-pipe frame upwardly to the upper dotted position shown in dotted lines in Fig. 2 and the marvering is accomplished while in this position, air being simultaneously admitted into the gather. The blow-pipe frame is temporarily held in its raised position by the circumferential portion 88$^b$ of the cam run 88 in the wheel 22 and is then lowered and swung, finally being positioned vertically (see Fig. 3) and the air and marvering clutch 86 and the main clutch 15 are again disengaged by the action of the arm 123 on the disc 23 put in motion by the clutch 24 which latter was closed by the rotation of the cam wheel 22. The marvering and main clutches are locked in their disengaged position by the latch 125, and the blow-pipe frame now remains stationary in its vertical position to permit the elongation of the gather.

The continued rotation of the disc 23, acting through the frame 129 after a properly determined time, disengages the latch 125 and again permits the closing of the main clutch 15 and the combined air and marvering clutch. The closing of the former causes the wheel 22 to be again put in rotation, but inasmuch as the blow-pipe frame is, at the commencement of such rotation, in the concentric run 88$^d$ thereof, the blow-pipe frame is not at such time moved and in a similar manner the marverer likewise remains stationary being under the control of the concentric run 80$^d$ of the cam 77. The air valve cam is however moved by the marverer clutch and controls the pressure in the gather at the proper period. This renewed rotation of the wheel 22 disengages the clutch 24, through the U-shaped lever 138 and engages through the rod 140 the mold closing clutch 32 to close the molds on the gather, where they will be locked by the latch 97, which will after a proper period be unlocked to permit the opening of the molds, after which the mold closing clutch will be again disengaged by the continued rotation of the wheel 22, which also by the lifting part 88$^a$ of its cam run, swings the blow-pipe back to normal position. The rotation of the wheel 22 is then arrested by the disengagement of the main clutch 15, which is permitted when the wheel itself is in normal position, by the pin 109 dropping into the recess 109$^a$ in the wheel, whereupon the several parts will all be stopped, being in their normal position and ready for a repetition of the operation upon the removal of the blow-pipe with the blow gather thereon and its replacement by another pipe with its fresh gather.

The adjustable block 131 on the swinging frame 129 whereby the main clutch is reengaged affords a means of accurately adjusting the time interval to elapse before the closing of the mold and the beginning of the blowing, but this automatic action of the machine in these operations may be dispensed with and the closing of the mold and the blowing be initialed by the operator who in this case is to watch the elongation of the gather and to reengage the main clutch and the blowing and marvering clutch at the proper time. As a means of permitting this a bell crank lever 143 (Fig. 2) is pivoted on the right side of the machine, its horizontal arm affording a handle while its vertical arm is connected to the swinging frame 129 by a link 144 so that a depression of the horizontal arm by the operator swings the frame to trip the latch 125 before described.

The manual trip before described demands the presence of an operator at the machine to watch the behavior of the gather and the adjustable timing mechanism, also before described, while automatic in its action, is based upon the similar behavior of the successive gathers, whereas the period of elongation required for each gather varies with the conditions of such gather, as to mass and temperature, etc. It is obvious that these may differ considerably in the several gathers under certain circumstances and I have therefore mounted an automatic controller for the blowing and molding, dependent not upon a presupposed condition of the gather, but upon the action of the particular gather being handled at the time. This I believe to be broadly novel with me. I will in this application point out one way in which it may be applied to the machine herein described.

Above the cooling tank and above the molds, I place (Figs. 25, 26, 27 and 28) clips 145 and 146, one of the clips 145 being stationary in so far as concerns the controlling action of the device while the opposite clip 146 is connected to a pivoted arm 147 which is pressed by a spring 148 in such a manner as to tend to move the clip 146 away from the clip 145. The two clips are connected by a thread or filament 149 of a material which will become severed when brought against or in proximity to the heated gather, such thread of filament while intact, preventing the separation of the clips. The movable clip is further connected by the cord or chain 150 (see also Fig. 7) with the horizontal arm of a bell crank 151 pivoted to the right hand side of the main frame. The vertical arm of this lever lies behind a latch 152 pivoted at 152$^a$ to the machine frame and provided with a shoulder 152$^b$, adapted to engage and hold raised a weight 153, provided with a bail 154 overlying the horizontal arm of the bell crank 143.

Under these circumstances when the clips are properly adjusted in height and are connected by the thread the gather when sufficiently elongated will destroy the latter, permitting the spring 148 to throw back the movable clip 146 and by the cord 150 to actuate the bell crank 151, releasing the weight 153 which by its mass, acting through the bell crank 143, engages the main clutch, through which the mold closing clutch is closed and also reengages the marvering and blowing clutch for its blowing action. I have found cotton thread a suitable substance to be used as the filament, in that when the gather in its elongation comes in contact therewith it is burnt without destroying the perfection of the finished bulb in any way, it neither abstracting heat from or putting a coating upon the gather which might impair the finish.

It is obvious that the weight 153 merely affords a source of energy between the thread and the clutch to actuate the latter with the consumption of a comparatively small expenditure of power, and that it might under circumstances be possible to throw the link 132 by connecting the cord 150 directly thereto. The construction shown however is to be preferred, and as a means of lifting the weight to store up the necessary energy I suspend it from one end of a chain 154ª which passing over a pulley 155 mounted in the main frame has its opposite end connected to the horizontal arm of a bell crank lever 156, pivoted in the frame and having its vertical arm connected to the right hand end of a thrust bar 157, supported in the frame by a link 157ª, the left hand end of the bar being held against the periphery of the wheel 22 by a spring 157ᵇ so that on the rotation of the wheel the peripherial stud 158, so located thereon as to clear the link 118, will thrust the bar 157 endwise towards the right, depressing the horizontal end of the lever 156, and lifting the weight, which is then caught by the latch 152, the thrust bar releasing itself from the stud due to the continued movement of the latter and falling back to normal position. The stud 158 is so positioned on the wheel that the weight is lifted following the initial engagement of the main clutch and also after the threading of the clips 145 and 146.

While the clips might if desired be threaded by hand, I have provided means whereby this may be accomplished automatically and in the operation of the machine which means are as follows:

The movable clip 146 is mounted on the rear end of a hollow rod 159 (Figs. 25 and 26) sliding in bearings 160 and 160ª located in front of and above the cooling tank, the clip being formed by a split lug projecting from the top of the rear end of the rod forming two ears between which the thread passes from a spool 161 carried in a bracket 170 on a projection 171 from the tank.

The fixed clip consists of the split and coned lower end of a rod 172 around which a collar 173 (see also Fig. 28) having a coned central recess, is adapted to slide, the collar being normally pressed downwardly by a spring 173ª, but being provided with a finger 173ᵇ adapted to be lifted by the closing bracket 91 and with an ear 173ᶜ adapted, when the mold collar is lifted, to be caught by a latch 174 pivoted in front of the frame of the machine. The collar is thus lifted by the closing of the mold on one gather, which positions it for the insertion of the thread to control the blowing of the following one.

The front guide 160ª for the sliding rod 159 is hung transversely on pivots from the forward projection 171 on the mold tank, while the rear guide 160 is mounted on the upper end of a spring supported stud 175, so that as the rod is projected rearwardly over the mold tank and above the open molds therein, the ears on the end of the rod will strike and pass the collet forming part of the fixed clip, the front end of the rod being depressed, after which it will be restored to its normal level by the spring supported stud 175, thus inserting the thread carried by the clip 146 between the ears of the fixed clip 145. The final rearward movement of the rod will cause the rear end of a bar 176 contained therein to coact with an anvil 176ᶠ on the lower end of the bracket 91 and will cause the lug forming the lip 146 to strike the lower end of the latch 174, throwing the latch rearwardly, releasing the collar 173, which will be thrown down upon the coned surface of the clip 145, closing the latter upon the thread. The impact of the bar on the anvil will also shove the bar within the rod and cause the coned end 176ª upon the rear end of the former to separate the ears of the movable clip 146 so that as the rod 159 is drawn forwardly and separated from the stationary clip, the ears of the movable clip will slip on the thread and will not firmly engage it again until the front end of the bar at the end of the forward movement of the rod strikes an anvil 177 on the projection 171, and is thus driven rearwardly again, removing its coned rear end from within the rear end of the rod and permitting the ears of the stationary clip to again close upon and engage the thread.

The rod 159 is reciprocated by a pin and slot connection 178 with the pivoted arm 147 connected by the driving spring 148 with a driving arm 179 pivoted upon the same centre as the arm 147 on the projection 171, the adjustment of the parts being such that the movement of the arm 179 to give a forward movement to the rod tends through the spring 148 to give a movement to the rod after the movable clip has engaged the thread and thus both holds the thread taut and places the spring under tension. As the actuating cord 150 is attached to the pivoted arm 147, the burning of thread permits the spring to jerk the arm forwardly and thus release the weight as before described.

The driving arm 179 is swung upon its pivot to reciprocate the rod 159 for threading by a driving device from the motor. In the drawings this consists of a pin and slot connection 180 to the upper end of a lever 181 pivoted in the projection 171 on the tank, the lower end of the lever having a pin and slot connection 182 with the downwardly projecting crank 183 on the end of a shaft 184 carried in the bearings 184ª on the front of the water tank, the opposite projecting crank 185 on the shaft 184 being connected by a rearwardly extending link 186 with one arm of the bell crank lever 187, the other arm of which is connected by a vertical link 188 with the outer end of a lever 189, (see Fig. 27) pivoted at 189ª, on the frame of the machine, the opposite end of such lever being so located adjacent to the face of the wheel 22. A setting lever 190 is pivoted at 190ª to the frame of the machine above the pivot of the resetting lever and has its end so located as to be struck by a pin 134 on the disk 22, the setting lever being connected by a link 191 intermediate its end and its pivot with the outer end of the resetting lever 189, so that on the initial rotation of the disk 22 and before the closing of the molds and the swinging of the pipe frame to vertical position, the pin 134 will by striking the inner end of the setting lever 190 depress it to pass by, and will through the connection described project the rod 159 rearwardly across the mold tank to engage the thread in the stationary clip. The inner end of the resetting lever will be raised at the same time into the path of the pin and will then be immediately engaged by the pin and be depressed to permit the passage of the pin, this retracting the bar and resetting the setting lever to be struck by the pin.

It will be noted that the arm 123 cooperating with the finger 124 forms a timing element to release the main clutch 15, thereby arresting the movement of the blow-pipe frame and permitting the movement of the molds, and to also arrest the movement of the marverer and air valve, for the purpose of permitting elongation and that the main clutch is subsequently reengaged automatically whether by the continued movement of parts driven through the clutch 24 or by the gatherer itself, to actuate the mold closing and opening mechanism, this reengagement being accompanied by the restoration of the connection between the driving power and the air valve. This intermission in the action of a manually closed clutch is an important feature in my invention.

It will be further seen in that so far as relates to molding, blowing and marvering devices, the form which may be given to the blow-pipe frame is immaterial and that many changes may be made therein and in the mounting thereof while the marverer itself may be likewise modified to suit the character of the work done. I will therefore use the term marverer as a generic expression to include any part adapted by contact with the blank to either properly distribute or shape the same.

What I claim is:—

1. In a glass blowing machine, the combination with a movable blow-pipe having several operative positions, of a separable mold, means for moving the blow-pipe in respect to the mold from one of said positions into another of said positions for elongation of the gather thereon and to present the gather to the mold and means for automatically closing the mold.

2. In a glass blowing machine, the combination of a blow-pipe, of a plurality of mechanisms adapted to act upon a gather of glass on the pipe, one of said mechanisms being a mold, means for moving the blow-pipe to remove the gather thereon away from the other of said mechanisms and to position it for elongation and to present it to the mold, and means for automatically closing the mold.

3. In a glass blowing machine the combination with a blow-pipe, of a separable mold, means for moving the blow-pipe to swing the gather thereon and to position it for elongation and molding and means for automatically closing the mold thereon.

4. In a glass blowing machine, the combination with a blow-pipe, of a separable mold, a motor, and means driven thereby for moving the blow-pipe to swing the gather thereon and to position it for elongation and molding and for closing the mold thereon.

5. In a glass blowing machine the combination with a blow-pipe, of a separable mold, means for moving the blow-pipe to position it for elongation of the gather thereon, and automatic means for closing the mold upon the gather after a predetermined period of elongation.

6. In a glass blowing machine, the combination with a blow-pipe, of a separable mold, a motor, and means driven thereby for moving the blow-pipe to swing the gather thereon and position the blow-pipe for elongation of the gather and automatic means for closing the mold upon the gather after a predetermined period of elongation.

7. In a glass blowing machine the combination with a blow-pipe, of a separable mold, a motor, means actuated thereby for moving the blow-pipe to swing, and to position it for the elongation of the gather thereon and for closing the mold upon the gather, all in a predetermined order and speed.

8. In a glass blowing machine, the combination with a blow-pipe, a marverer, and a separable mold, of mold closing means, of means for moving the blow-pipe to a marvering position, to swing it and to position it vertically for elongating and molding and to then remove the blown bulb away from the mold.

9. In a glass blowing machine, the combination with a blow-pipe, a support therefor, of a mold and its closing mechanism, a marverer mounted on and movable in respect to the support, means for moving the marverer on the support to bring it into contact with the gather on the blow-pipe and for moving the support to position the blow-pipe thereon for marvering and molding.

10. In a glass blowing machine, the combination with a blow-pipe, a support therefor, of a mold and its closing mechanism, a marverer mounted on and movable in respect to the support, means for moving the marverer on the support to bring it into contact with the gather on the blow-pipe and for moving the support in a vertical plane to position the blow-pipe thereon for marvering, to swing the marvered gather, and to position it for elongation and molding.

11. In a machine for producing glass articles, the combination with a blow-pipe, of means for rotating the same a marverer, a motor and means actuated thereby for causing the marverer to approach and recede from the blow-pipe in a predetermined manner.

12. In a machine for producing glass articles, the combination with a blow-pipe and its support, of means for rotating the blow pipe a marverer movably mounted on the support, and means for swinging the support to position the blow-pipe for marvering and for simultaneously causing the marverer to approach the blow-pipe.

13. The combination with a blow-pipe, of a hollow marverer, means for introducing a temperature controlling fluid into the marverer, means for rotating the blow-pipe and means for bringing the marverer and a gather of glass upon the blow-pipe into contact, substantially as described.

14. The combination with a blow-pipe frame, oscillating about a horizontal axis, a marverer movably mounted on said frame, means for oscillating the frame from a horizontal position to lift the marverer, to swing the gather and to hold the frame vertically, an air valve on the frame controlling the air pressure in the blow-pipe, driving means controlling the movement of the marverer towards and from the gather, and a clutch coordinated in its action with the movement of the frame for controlling the movement of the marverer and of the air valve.

15. The combination with an oscillating blow-pipe frame, a marverer carried thereon in proximity to the end of the blow-pipe, a mold located adjacent to the path of the frame, and means for causing the marverer to approach the gather when the frame is distant from the mold and to swing away therefrom, to clear the mold, when the frame is near the mold.

16. The combination with a blow-pipe and its support, of a mold and its closing mechanism, an actuating mechanism for the support adapted to move the same to swing the blow-pipe to position the same vertically for elongating and molding and to then oscillate the same to a substantially horizontal position, a marverer and means for bringing the marverer into contact with the gather upon the blow-pipe prior to the swinging.

17. In a glass blowing machine, the combination with a source of air pressure, of a blow-pipe connected with the air source, a relief valve for connecting the interior of the blow-pipe with the atmosphere, a pressure valve for controlling the connection of the interior of the blow-pipe with the source of air and means for opening the relief valve, closing the same and opening and closing the pressure valve.

18. In a glass blowing machine, the combination with a source of air under pressure, a blow-pipe, means for connecting the interior of the blow-pipe with the atmosphere, with the air source and with the atmosphere again, in the order given, substantially as described.

19. In a glass blowing machine, the combination with a marverer, of a mold, a blow-pipe adapted to present a gather of glass to the marverer and mold in succession, means for admitting air under pressure into the gather during molding and means for equalizing the external and internal atmosphere pressure of the gather during marvering.

20. In a glass blowing machine, the combination with a blow-pipe having a circumferential series of recesses therein, an air casing, a chuck block apertured to admit air to the blow-pipe, spring pressed jaws pivoted in the chuck block, adapted to engage the recesses in the blow-pipe, a rotating cam ring for disengaging the jaws from the recesses, an air valve controlling the admission of air from the air head to the chuck, a relief valve, controlling the connection between the atmosphere and the interior of the chuck and a cam wheel adapted to actuate the said valves, substantially as described.

21. In a glass blowing machine, the combination with a blow-pipe having a circumferential series of recesses therein, an air casing, a chuck block apertured to admit air to the blow-pipe, spring pressed jaws pivoted in the chuck block, adapted to engage the recesses in the blow-pipe, a rotating cam ring for disengaging the jaws from the recesses, an air valve controlling the admission of air from the air head to the chuck, a relief valve, controlling the connection between the atmosphere and the interior of the chuck and a cam adapted to first open the relief valve and after the closing thereof to open the air valve and to then again open the relief valve.

22. In a glass blowing machine the combination with a movable blow-pipe, of a marverer, a separable mold, a motor, a closable clutch driven by the motor to effect the marvering and to position the blow-pipe for elongation, automatic means for disengaging the clutch to permit elongation and means for closing the molds and for reclosing the clutch to finally restore the blow-pipe to normal position.

23. In a glass blowing machine the combination with a movable blow-pipe, of a marverer, and a separable mold, a motor, a closable clutch driven by the motor to effect the marvering and to position the blow-pipe for elongation, and automatic means for closing the mold, and for finally restoring the blow-pipe to normal position.

24. In a glass blowing machine, the combination with a movable blow-pipe and a separable mold, of a motor, a closable clutch driven by the motor to swing the blow-pipe and position it for the elongation of the gather, automatic means for disengaging the clutch with the blow-pipe in the last named position means for closing the mold, and means for returning the several parts to normal position.

25. In a glass blowing machine, the combination with a movable blow-pipe, a movable marverer, and a separable mold, a source of power transmission therefor, a manually closed clutch in the transmission for moving the blow-pipe to marver and to swing the blow-pipe and present it to the mold, and for moving the marverer towards and away from the gather upon the blow-pipe, an automatic timing element for disengaging the clutch to arrest the movement of the blow-pipe carrier and marverer, and automatic means for reengaging the clutch to close the mold, and to restore the blow-pipe carrier to normal position.

26. In a glass blowing machine, the combination with a movable blow-pipe, a movable marverer, and a separable mold, of a power transmission therefor, a manually closed clutch in the transmission for moving the blow-pipe and presenting the blow-pipe to the mold, and for moving the marverer towards and away from the gather on the blow-pipe and automatic means for opening the clutch to arrest the movement of the parts driven thereby and for then reengaging the clutch to close and open the mold and to restore the blow-pipe to normal position.

27. In a machine for producing blown articles, the combination with a blow pipe mounted to oscillate in a vertical plane, a marverer, a separable mold coacting with the blow-pipe, a motor and means actuated for thereby controlling the admission of air to the blow-pipe, and means for oscillating the blow pipe to lift the gathering end of the blow pipe, for marvering the gather and to position the blow pipe vertically, to close the molds and to admit air into the blow-pipe.

28. In a glass blowing machine for working glass, the combination of a main frame, a blow-pipe frame mounted on the main frame for rotary movement in a vertical plane, a blow pipe carried thereon, a marverer carried and movable on one end of the blow-pipe frame, an air head comprising pressure and relief valves carried on the other end of the blow-pipe frame, a separable mold located at the base of the main frame, a motor and connections therefor to the blow-pipe frame, marverer, air head and mold, manually controlled means for connecting the motor with the blow-pipe frame to lift the marvering end thereof and to swing it, for connecting the motor with the marverer to move it towards the gather on the blow-pipe and to connect the motor with the air head to actuate the relief valve, and automatic means to break the said connections with the blow-pipe frame vertical, the marverer away from the gather and the relief valve closed, and automatic means to connect the motor with the blow-pipe frame to restore it to horizontal position, to connect the motor with the blow-head to actuate the pressure valve and to connect the motor with the mold to open and close it.

29. In a machine for producing glass articles, the combination with a blow-pipe, of means for rotating the blow pipe, a marverer, and means for automatically causing the distance between the marverer and the axis of the blow-pipe to vary during the marvering in a predetermined manner, substantially as described.

30. In a machine for producing blown glass articles, the combination of a rotatable blow-pipe, of a mold, a marverer and an actuating mechanism and connections therefrom to successively and automatically lift the gather end of the blow-pipe to marver, swing the blow-pipe and present it vertically to the mold, and close the mold, substantially as described.

31. In a machine for producing blown glass articles, the combination with a rotatable blow-pipe, of a mold, a marverer, and an actuating mechanism and connections therefrom to successively and automatically lift the gather end of the blow-pipe, to bring the raised gather end of the blow-pipe and marverer into co-operative relation to the marver, to swing the blow-pipe and to present it vertically to the mold and to close the mold, substantially as described.

32. The combination with a blow-pipe, a mold, and a closing mechanism therefor, an actuating mechanism for the blow-pipe adapted to swing the blow-pipe to position the same vertically for elongating and molding and to then oscillate the blow-pipe to a raised position and a marverer, actuating mechanism therefor and mechanism for causing it to act upon the gather upon the blow-pipe prior to the swinging, substantially as described.

33. In a glass blowing machine, the combination with a separable mold, a movable blow-pipe support, driving mechanism, means actuated by the driving mechanism in a predetermined order and speed to move the blow-pipe support for swinging the gather and to position the blow-pipe for elongating and molding, and to close the mold, substantially as described.

34. The combination with a blow-pipe support, of a mold and its closing mechanism, means for moving the blow-pipe support to swing the blow-pipe to position the blow-pipe vertically for elongation and molding and to then raise the gather end of the blow-pipe, substantially as described.

35. In a glass blowing machine, the combination of a marverer and a mold, of a blow-pipe, a driving mechanism, means actuated thereby for marvering the glass upon the blow-pipe and admitting air thereto at such time and for subsequently presenting the glass to the mold and for admitting air to the blow-pipe, substantially as described.

36. In a glass blowing machine the combination with a marverer, of a blow frame adapted to receive a blow-pipe, means for causing relative movement of the parts to effect a marvering of the glass on the blow-pipe, and means for causing a movement of a heat abstracting fluid adjacent to the marvering face to control the temperature thereof.

37. In apparatus of the character described, the combination with a gathering device adapted to collect a body of glass, of a marver, a mechnism for revolving said gathering device in said marver, and mechanism for shifting the angular position of the marver while the glass is in contact therewith.

38. In apparatus of the character described, the combination with supporting means, of a marver pivoted thereon, a cam, and means operated by said cam for tilting said marver.

39. In apparatus of the character described, the combination with movable supporting means, of a tilting marver thereon, and means set in operation at a predetermined point in the travel of said supporting means for tilting said marver.

40. In apparatus of the character described, the combination with movable supporting means, of a tilting marver thereon, a stationary cam, and means adapted to be engaged by said cam for tilting said marver.

41. In apparatus of the character described, the combination with a gathering device adapted to collect a body of glass, of a marver, means for revolving the gathering device with the glass thereon in contact with the marver, and means for shifting the angular relation between the gathering device and the marver while the glass is in contact therewith.

42. In apparatus of the character described, the combination with a gathering device, of a marver, means for bringing said gathering device and marver together so that the body of glass on the gathering device comes into contact with the marver, means for shifting the angular relation between the gathering device and the marver while the body of glass is in contact with the latter, and means for revolving the gathering device.

43. In apparatus of the character described, the combination with movable supporting means, of a gathering device and a marver carried on the supporting means, a mechanism actuated by the movement of said supporting means for bringing the gathering device and marver together so that the body of glass on the former comes into contact with the latter and mechanism for shifting the angular position of the gathering device and marver while the body of glass is in contact with the marver.

44. In a glass working machine, the combination with blowing and molding mechanisms, of a blow-pipe support adapted to receive a removable blow-pipe, a marverer, means for rotating the blow-pipe contained in such support upon its longitudinal axis and with its end adjacent to the marverer, means for rotating the blow-pipe support in a vertical plane to swing the blow-pipe and for presenting the end of the blow-pipe to the molding mechanism.

45. In a glass working machine, the combination with blowing and molding mechanisms, of a blow-pipe support adapted to receive a removable blow-pipe, a marverer, means for rotating the blow-pipe contained in such support upon its longitudinal axis and with its end adjacent to the marverer, means for rotating the blow-pipe in the support around a horizontal axis and presenting it vertically with its end adjacent to the molding mechanism.

46. In a glass blowing machine, the combination with a blow-pipe, of a separable mold, means for moving the blow-pipe in respect to the mold to position it for the elongation and molding of the gather thereon; and means for automatically closing the mold.

47. In a glass blowing machine, the combination with a blow-pipe, of a separable mold, a motor and means driven thereby for moving the blow-pipe in respect to the mold to position it for elongation and molding and for closing the mold.

48. In a machine for producing glass articles, the combination with a blow-pipe, of a marverer, means for producing a marvering action between the gather and the marverer, and means for automatically causing the distance between the marverer and the axis of the blow-pipe to vary during the marvering in a predetermined manner.

49. In a machine for producing glass articles, the combination with a blow-pipe, of means for rotating the blow-pipe, a marvering part, and means for automatically causing the distance between the blow-pipe and a surface of the marvering part to vary during the marvering in a predetermined manner.

In testimony whereof I have signed my name at Corning, New York.

ORIN A. HANFORD.